US008238470B2

(12) United States Patent
Dally

(10) Patent No.: US 8,238,470 B2
(45) Date of Patent: Aug. 7, 2012

(54) DIGITAL TRANSMITTER

(75) Inventor: William J. Dally, Stanford, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/090,507

(22) Filed: Apr. 20, 2011

(65) Prior Publication Data
US 2011/0255633 A1 Oct. 20, 2011

Related U.S. Application Data

(63) Continuation of application No. 13/027,893, filed on Feb. 15, 2011, which is a continuation of application No. 12/571,582, filed on Oct. 1, 2009, which is a continuation of application No. 11/514,735, filed on Aug. 31, 2006, which is a continuation of application No. 11/483,971, filed on Jul. 10, 2006, now abandoned, which is a continuation of application No. 10/372,630, filed on Feb. 24, 2003, now Pat. No. 7,099,404, which is a continuation of application No. 09/852,481, filed on May 10, 2001, now Pat. No. 6,542,555, which is a continuation of application No. 08/882,252, filed on Jun. 25, 1997, now Pat. No. 6,266,379, which is a continuation-in-part of application No. 08/880,980, filed on Jun. 23, 1997, now abandoned.

(60) Provisional application No. 60/050,098, filed on Jun. 20, 1997.

(51) Int. Cl.
H04L 27/04 (2006.01)
H04L 25/03 (2006.01)
H04L 27/00 (2006.01)
H03K 5/156 (2006.01)

(52) U.S. Cl. ......... 375/295; 375/296; 375/256; 375/229
(58) Field of Classification Search ............... 375/285, 375/256–258, 229, 230, 231, 295, 296, 377; 333/28 R, 18
See application file for complete search history.

(56) References Cited

U.S. PATENT DOCUMENTS 3,593,142 A 7/1971 Freeny et al.
3,777,130 A 12/1973 Crosier et al.
3,806,807 A 4/1974 Nakamura ..................... 325/42
3,865,988 A 2/1975 Getgen ..................... 179/15 AA (Continued)

FOREIGN PATENT DOCUMENTS
DE 2853029 A1 6/1979

(Continued)

OTHER PUBLICATIONS

Minutes of JC-42.3 Meeting No. 55, Committee on MOS Memories, JEDEC 13674-13676, Sep. 19, 1990, Denver, CO. 57 pages.

(Continued)

Primary Examiner — Tesfaldet Bocure
(74) Attorney, Agent, or Firm — Hamilton, Brook, Smith & Reynolds, P.C.

(57) ABSTRACT

An equalizer provided in a digital transmitter compensates for attenuation in a signal channel to a digital receiver. The equalizer generates signal levels as a logical function of bit history to emphasize transition signal levels relative to repeated signal levels. The preferred equalizer includes an FIR transition filter using a look-up table. Parallel circuits including FIR filters and digital-to-analog converters provide a high speed equalizer with lower speed circuitry. The equalizer is particularly suited to in-cabinet and local area network transmissions where feedback circuitry facilitates adaptive training of the equalizer.

43 Claims, 10 Drawing Sheets

U.S. PATENT DOCUMENTS

| | | |
|---|---|---|
| 3,906,400 A | 9/1975 | Gooding et al. |
| 3,909,510 A | 9/1975 | Luce |
| 3,914,588 A | 10/1975 | Nussbaumer |
| 3,943,496 A | 3/1976 | Padgett et al. ......... 340/173 DR |
| 3,950,735 A | 4/1976 | Patel ........................ 340/172.5 |
| 3,980,826 A | 9/1976 | Widmer ............................ 178/68 |
| 3,987,288 A | 10/1976 | Franks |
| 4,006,468 A | 2/1977 | Webster ................. 340/173 DR |
| 4,011,530 A | 3/1977 | Carver ........................ 333/28 R |
| 4,041,239 A | 8/1977 | Haass ............................... 178/68 |
| 4,068,105 A | 1/1978 | Jain et al. |
| 4,170,715 A | 10/1979 | Mizokawa ...................... 178/68 |
| 4,183,095 A | 1/1980 | Ward ............................. 365/189 |
| 4,281,401 A | 7/1981 | Redwine ........................ 365/222 |
| 4,315,308 A | 2/1982 | Jackson ........................ 364/200 |
| 4,330,852 A | 5/1982 | Redwine et al. .............. 365/221 |
| 4,337,523 A | 6/1982 | Hotta et al. ..................... 365/194 |
| 4,374,426 A | 2/1983 | Burlage et al. |
| 4,379,222 A | 4/1983 | Hayter et al. .................... 377/81 |
| 4,445,204 A | 4/1984 | Nishiguchi ..................... 365/194 |
| 4,499,536 A | 2/1985 | Gemma et al. ................. 364/200 |
| 4,520,465 A | 5/1985 | Sood ............................. 365/203 |
| 4,535,443 A | 8/1985 | Korevaar |
| 4,556,983 A | 12/1985 | Heitmann et al. |
| 4,584,690 A | 4/1986 | Cafiero et al. .................... 375/18 |
| 4,637,018 A | 1/1987 | Flora et al. ......................... 371/1 |
| 4,646,270 A | 2/1987 | Voss .............................. 365/230 |
| 4,649,522 A | 3/1987 | Kirsch ........................... 365/189 |
| 4,663,735 A | 5/1987 | Novak et al. .................... 364/900 |
| 4,712,190 A | 12/1987 | Guglielmi et al. ............. 364/900 |
| 4,719,602 A | 1/1988 | Hag et al. ....................... 365/230 |
| 4,744,062 A | 5/1988 | Nakamura et al. ............ 365/228 |
| 4,755,937 A | 7/1988 | Glier .............................. 364/200 |
| 4,763,249 A | 8/1988 | Bomba et al. .................. 364/200 |
| 4,785,396 A | 11/1988 | Murphy et al. ................. 364/200 |
| 4,792,926 A | 12/1988 | Roberts ......................... 365/189 |
| 4,792,929 A | 12/1988 | Olson et al. .................... 365/233 |
| 4,797,898 A | 1/1989 | Martinez |
| 4,799,199 A | 1/1989 | Scales, III et al. ............. 365/230 |
| 4,800,530 A | 1/1989 | Itoh et al. ....................... 365/189 |
| 4,803,621 A | 2/1989 | Kelly ............................. 364/200 |
| 4,821,226 A | 4/1989 | Christopher et al. .......... 364/900 |
| 4,825,411 A | 4/1989 | Hamano ........................ 365/189 |
| 4,845,664 A | 7/1989 | Aichelmann, Jr. et al. ... 364/900 |
| 4,845,677 A | 7/1989 | Chappell et al. .......... 365/189.02 |
| 4,849,937 A | 7/1989 | Yoshimoto ............... 365/189.05 |
| 4,849,957 A | 7/1989 | Suzuki |
| 4,866,675 A | 9/1989 | Kawashima ................... 365/194 |
| 4,875,192 A | 10/1989 | Matsumoto .................... 365/193 |
| 4,882,712 A | 11/1989 | Ohno et al. .................... 365/206 |
| 4,891,791 A | 1/1990 | Iijima ....................... 365/189.01 |
| 4,901,283 A | 2/1990 | Hanbury |
| 4,916,670 A | 4/1990 | Suzuki et al. .................. 365/233 |
| 4,920,483 A | 4/1990 | Pogue et al. ................... 364/200 |
| 4,928,265 A | 5/1990 | Higuchi et al. ........... 365/189.01 |
| 4,933,910 A | 6/1990 | Olson et al. ................. 365/238.5 |
| 4,937,734 A | 6/1990 | Bechtolsheim ............... 364/200 |
| 4,941,128 A | 7/1990 | Wada et al. .................... 365/203 |
| 4,945,516 A | 7/1990 | Kashiyama ............... 365/189.05 |
| 4,953,128 A | 8/1990 | Kawai et al. ................... 365/194 |
| 5,001,672 A | 3/1991 | Ebbers et al. .............. 365/230.05 |
| 5,008,903 A | 4/1991 | Betts et al. |
| 5,051,889 A | 9/1991 | Fung et al. ..................... 364/200 |
| 5,058,130 A | 10/1991 | Park .................................. 375/12 |
| 5,077,693 A | 12/1991 | Hardee et al. ............. 365/230.08 |
| 5,083,296 A | 1/1992 | Hara et al. ................. 365/230.02 |
| 5,111,386 A | 5/1992 | Fujishima et al. ............. 395/425 |
| 5,119,402 A | 6/1992 | Ginzburg et al. |
| 5,124,589 A | 6/1992 | Shiomi et al. .................. 307/465 |
| 5,134,699 A | 7/1992 | Aria et al. ...................... 395/425 |
| 5,140,613 A | 8/1992 | Birgenheier et al. |
| 5,140,688 A | 8/1992 | White et al. ................... 395/550 |
| 5,179,687 A | 1/1993 | Hidaka et al. ................. 395/425 |
| 5,204,880 A | 4/1993 | Wurster et al. .................. 375/36 |
| 5,218,684 A | 6/1993 | Hayes et al. ................... 395/400 |
| 5,226,147 A | 7/1993 | Fujishima et al. ............. 395/425 |
| 5,254,883 A | 10/1993 | Horowitz ........................ 307/443 |
| 5,260,905 A | 11/1993 | Mori ......................... 365/230.05 |
| 5,267,269 A | 11/1993 | Shih et al. ........................ 375/60 |
| 5,268,639 A | 12/1993 | Gasbarro ........................ 324/158 |
| 5,276,858 A | 1/1994 | Oak et al. ....................... 395/550 |
| 5,301,278 A | 4/1994 | Bowater et al. ................ 395/275 |
| 5,305,278 A | 4/1994 | Inoue ........................ 365/230.03 |
| 5,311,483 A | 5/1994 | Takasugi ........................ 365/233 |
| 5,313,624 A | 5/1994 | Harriman et al. .............. 395/575 |
| 5,319,755 A | 6/1994 | Horowitz ........................ 395/325 |
| 5,323,358 A | 6/1994 | Toda et al. ................. 365/230.09 |
| 5,327,390 A | 7/1994 | Takasugi ........................ 365/230 |
| 5,339,276 A | 8/1994 | Takasugi ................... 365/230.02 |
| 5,341,341 A | 8/1994 | Fukuzo ........................... 365/233 |
| 5,343,503 A | 8/1994 | Goodrich ........................ 375/121 |
| 5,345,573 A | 9/1994 | Bowden, III et al. .......... 395/400 |
| 5,355,391 A | 10/1994 | Horowitz .......................... 375/36 |
| 5,357,145 A | 10/1994 | Segaram |
| 5,365,489 A | 11/1994 | Jeong ........................ 365/230.03 |
| 5,381,376 A | 1/1995 | Kim et al. .................. 365/230.03 |
| 5,384,745 A | 1/1995 | Konishi et al. ............ 365/230.03 |
| 5,386,385 A | 1/1995 | Stephens, Jr. ............. 365/189.05 |
| 5,390,149 A | 2/1995 | Vogley et al. ............. 365/189.01 |
| 5,390,308 A | 2/1995 | Ware ............................. 395/400 |
| 5,392,239 A | 2/1995 | Margulis et al. .......... 365/189.01 |
| 5,404,338 A | 4/1995 | Murai et al. .................... 365/233 |
| 5,404,463 A | 4/1995 | McGarvey ..................... 395/325 |
| 5,410,188 A | 4/1995 | Segaram |
| 5,412,691 A | 5/1995 | Ginzburg et al. |
| 5,414,830 A | 5/1995 | Marbot .......................... 395/500 |
| 5,418,670 A | 5/1995 | McClure et al. |
| 5,430,676 A | 7/1995 | Ware ......................... 365/189.02 |
| 5,432,823 A | 7/1995 | Gasbarro ........................ 375/356 |
| 5,444,667 A | 8/1995 | Obara et al. .................... 365/233 |
| 5,455,803 A | 10/1995 | Kodama ......................... 365/233 |
| 5,504,874 A | 4/1996 | Galles et al. ................... 395/472 |
| 5,513,327 A | 4/1996 | Farmwald ..................... 395/309 |
| 5,521,946 A | 5/1996 | Main |
| 5,533,204 A | 7/1996 | Tipley ............................ 395/288 |
| 5,539,696 A | 7/1996 | Patel ............................. 365/189 |
| 5,541,957 A | 7/1996 | Lau |
| 5,548,786 A | 8/1996 | Amini et al. ................... 395/842 |
| 5,553,248 A | 9/1996 | Melo et al. ..................... 395/296 |
| 5,608,757 A | 3/1997 | Smith et al. |
| 5,611,058 A | 3/1997 | Moore et al. ................... 395/309 |
| 5,638,531 A | 6/1997 | Crump et al. .................. 395/450 |
| 5,649,161 A | 7/1997 | Andrade et al. ................ 395/494 |
| 5,651,028 A | 7/1997 | Harris et al. |
| 5,655,078 A | 8/1997 | Anderson et al. |
| 5,655,105 A | 8/1997 | McLaury ........................ 711/169 |
| 5,655,113 A | 8/1997 | Leung et al. ................... 395/552 |
| 5,687,183 A | 11/1997 | Chesley ........................... 371/41 |
| 5,748,914 A | 5/1998 | Ware .............................. 395/285 |
| 5,754,764 A | 5/1998 | Davis et al. |
| 5,778,029 A | 7/1998 | Kaufmann |
| 5,778,419 A | 7/1998 | Hansen et al. ................. 711/112 |
| 5,802,103 A | 9/1998 | Jeong ............................. 375/220 |
| 5,805,089 A | 9/1998 | Fiedler et al. |
| 5,809,552 A | 9/1998 | Kuroiwa et al. ............... 711/169 |
| 5,844,858 A | 12/1998 | Kyung ............................ 365/233 |
| 5,966,032 A | 10/1999 | Elrabaa et al. |
| 5,983,070 A | 11/1999 | Georges et al. |
| 6,065,092 A | 5/2000 | Roy .................................. 711/5 |
| 6,112,284 A | 8/2000 | Hayek et al. .................... 711/167 |
| 6,137,524 A | 10/2000 | Chea ................................ 348/6 |
| 6,211,714 B1 | 4/2001 | Jeong ............................. 327/293 |
| 6,266,379 B1 | 7/2001 | Dally |
| 6,470,405 B2 | 10/2002 | Hampel ......................... 710/100 |
| 6,542,555 B2 | 4/2003 | Dally |
| 6,584,037 B2 | 6/2003 | Farmwald ...................... 365/233 |
| 6,591,353 B1 | 7/2003 | Ware .............................. 711/167 |
| 6,748,507 B2 | 6/2004 | Kawasaki et al. .............. 711/167 |
| 6,931,467 B2 | 8/2005 | Ware .............................. 710/100 |
| 7,099,404 B2 | 8/2006 | Dally |
| 7,287,109 B2 | 10/2007 | Barth ............................. 710/100 |
| 7,526,046 B2 | 4/2009 | Dally |
| 7,564,920 B1 | 7/2009 | Dally |
| 7,580,474 B2 | 8/2009 | Dally ............................. 375/295 |
| 7,586,987 B2 | 9/2009 | Vorenkamp et al. |
| 7,602,857 B2 | 10/2009 | Dally |
| 7,602,858 B2 | 10/2009 | Dally |

| | | |
|---|---|---|
| 7,706,464 B2 | 4/2010 | Dally |
| 7,715,494 B2 | 5/2010 | Dally |
| 2004/0095838 A1 | 5/2004 | Li ................... 365/233 |
| 2004/0125887 A1 | 7/2004 | Dryden et al. |
| 2006/0291587 A1 | 12/2006 | Dally |
| 2009/0262794 A1 | 10/2009 | Dally ................. 375/230 |
| 2010/0034252 A1 | 2/2010 | Dally |
| 2011/0051794 A1 | 3/2011 | Dally ................. 375/229 |
| 2011/0135032 A1 | 6/2011 | Dally ................. 375/295 |
| 2011/0200085 A1 | 8/2011 | Dally ................. 375/224 |
| 2011/0255633 A1 | 10/2011 | Dally ................. 375/295 |

FOREIGN PATENT DOCUMENTS

| | | |
|---|---|---|
| DE | 2853059 | 6/1979 |
| EP | 0339224 A2 | 11/1989 |
| EP | 0384620 | 8/1990 |
| EP | 0474185 A1 | 3/1992 |
| EP | 0535670 A1 | 4/1993 |
| EP | 0561370 A2 | 9/1993 |
| EP | 0605887 B1 | 9/2001 |
| FR | 2695227 A1 | 3/1994 |
| JP | S57-210495 | 12/1982 |
| JP | SHO 61-107453 A2 | 5/1986 |
| JP | 61160129 A2 | 7/1986 |
| JP | 61160130 A2 | 7/1986 |
| JP | SHO 61-160556 A | 7/1986 |
| JP | 61245255 A2 | 10/1986 |
| JP | 62016289 A2 | 1/1987 |
| JP | 62135949 A2 | 6/1987 |
| JP | 62-248330 | 10/1987 |
| JP | SHO 63-34795 | 2/1988 |
| JP | 63-091766 A2 | 4/1988 |
| JP | 63-217452 | 9/1988 |
| JP | 63239676 A2 | 10/1988 |
| JP | 01163849 | 6/1989 |
| JP | 1-236494 | 9/1989 |
| JP | 3-276344 | 12/1991 |
| JP | 05-315988 | 11/1993 |
| JP | 05-315998 | 11/1993 |
| JP | 6103153 A2 | 4/1994 |
| JP | 7-262769 | 10/1995 |

OTHER PUBLICATIONS

National Semiconductor, "DP83840 10/100 Mb/s Ethernet Physical Layer," Preliminary Datasheet, Nov. 1995. 56 pages.

National Semiconductor, "DP83840A 10/100 Mb/s Ethernet Physical Layer," Datasheet, Version A, Mar. 1997. 89 pages.

Gustavson et al., "9. Appendix B: SyncLink," Ramlink: Appendix, 1993, R1353499-506, pp. 43-50. 8 pages.

"IEEE Standard for High-Bandwidth Memory Interface Based on SCI Signaling Technology (RamLink)," Draft 1.00, Dec. 13, 1993, IEEE P1596.4-199X, Microprocessor and Microcomputer Standards Subcommittee of the IEEE Computer Society. 96 pages.

"RamLink: High-Bandwidth Memory Interface Based on SCI Signaling Technology," Draft Standard, Mar. 21, 1992, RamLink: D0.45, P1596.4, Draft for Review by the Working Group. 57 pages.

"RamLink Standard," SCI: Section 1.-D2.06, P1596, Jan. 11, 1993, IEEE, R-ITC-10047152-191. 40 pages.

Synclink Annexes to RamLink Standard, Annex A-C, Draft 1.00, Dec. 13, 1993, Based on SCI Signaling Technology (RamLink), IEEE, P1596.4-199X, R1356826-863, R1356870-871, 81356874-885. 52 pages.

"Draft Standard for a High-Speed Memory Interface (SyncLink)," SyncLink Standard, Draft 0.75, IEEE P1596.7, Nov. 3, 1995, Microprocessor and Microcomputer Standards Subcommittee of the IEEE Computer Society, R7365987-R7366044. 58 pages.

Widmer, Albert, "Documents Produced by Albert Widmer," Jul. 8, 2011, letter to Mr. Lance Yang. 1 page.

Lammers, David, "Amkor sets U.S. BGA plant," May 15, 1995 (SEA753-0105112). 1 page.

LSI Logic, "CoreWare GigaBlaze SeriaLink Transceiver Cores Datasheet," 1996, (LSI753-0475243 to 246). 4 pages.

IBM, Presentations made to JEDEC on or about May 7, 1992 in New Orleans, Louisiana (LSI753-0475247 to 467). 221 pages.

Documents related to IBM DRAM products including Gazelle and Luna (IBM 000412 to 486), Mar. 1987-1993—as of Sep. 6, 2011 we only have IBM 000412 to 432). 21 pages.

Jacob et al., "Memory Systems: Cache, DRAM, Disk," ISBN: 978-0123797513, Morgan Kaufmann: San Francisco, CA, 2008. 23 pages.

MoSys Incorporated, "Company Backgrounder," Jul. 1994 (LSI753-0473041 to 043). 3 pages.

Byte Press Release, "MoSys' Multibank DRAM (MDRAM) at Heart of Byte Magazine's 'Best of COMDEX/Fall 95' Award Winner, Tseng Lab's ET6000," Nov. 28, 1995, found at http://web.archive.org/web/19980125065916/www.mosysinc.com/press/byte.html on Sep. 18, 2006 (LSI753-0473069 to 070). 2 pages.

Przybylski, Steven, "MoSys Reveals MDRAM Architecture: Radical Alternative Is Not Just Another VRAM," Dec. 25, 1995, Microprocessor Report pp. 17-20 (LSI753-0473045 to 048). 4 pages.

MoSys Press Releases, "MoSys Innovative Ultra-High-Performance DRAM Architecture Basis for Breakthrough Graphics and Multimedia Engine," Nov. 13, 1995, found at file://C:\DOCUME~1\tgb\LOCALS~1\Temp\QDROQ5PO.htm on Sep. 18, 2006 (LSI753-0473067 to 067). 2 pages.

Gjessing et al., "RamLink: A High-Bandwidth Point-to-Point Memory Architecture," with Attached Standard, 1992, IEEE, pp. 328-331. 105 pages.

Rambus Inc., "RDRAM," articles related to RDRAM technology, Mar. 1992-Dec. 1994 (LSI753-0466501 to 518, 566 to 589). 42 pages.

LSI Logic, "SeriaLink BDSL500 Evaluation Board User's Guide," May 1997, and related documentation (LSI753-0474928 to 993). 66 pages.

Dipert, Brian, "The Slammin', Jammin' DRAM Scramble," Jan. 20, 2000, EDN, vol. 2000, No. 2, pp. 68-82. 12 pages.

University of North Carolina, "ARPA Proposal," Mar. 7, 1996. 61 pages.

O'Connell et al., "Serial Link Breaks the I/O Bottleneck," Electronic Design, Computer Systems Special Editorial, Jul. 22, 1996, pp. 124-127. 9 pages.

Karen O'Connell (LSI Logic Corporation) Fax to Karen Huffstutter (Seagate), dated Jul. 10, 1992 (SEA753-0105250 to 251). 2 pages.

Seagate Aurora 170, "Project Schedule" and related documentation, dated May 20, 1995 (SEA753-0105057 to 059). 3 pages.

LSI/Cabletron, "Test Change Authorization," Dec. 16, 1996 (LSI753-0877638 to 639). 2 pages.

LSI Logic, "Application Note, Initial Design Review (IDR) Check List," Sep. 12, 1995 (LSI753-0877571 to 585). 15 pages.

LSI Logic, "Application Note, Pre-Layout Verification Checklist," May 17, 1996 (LSI753-0877598 to 632). 35 pages.

LSI Logic, "GigaBlaze 500 SeriaLink Core Design Manual," Apr. 1997 (LSI753-0474994 to 0475142). 149 pages.

LSI Logic, "GigaBlaze SeriaLink 500 Core Preliminary Datasheet," Feb. 1998 (LSI753-0475143 to 150). 8 pages.

LSI/Cabletron, "Attachment H: L1A9791 Test Waiver," Sep. 6, 1996 (LSI753-0877597). 1 page.

LSI Logic Statement of Work and correspondence re products incorporating the CWSL500 Core Technology dated 1995 (SEA753-0105087 to 093). 7 pages.

MoSys Inc., "MDRAM datasheet," MD904 to MD920, ½ to 2½ MByte Multibank DRAM (MDRAM) 128K×32 to 656K×32 Preliminary Information, 1997 (LSI753-0473073 to 088). 16 pages.

LSI Logic, "SeriaLink CWSL500 Core Design Manual," Preliminary, Jun. 5, 1996 (LSI753-0877703 to 953). 251 pages.

LSI Logic, "SL500FCT Specification 500K Fibre Channel Transceiver," Jul. 9, 1996, Rev. 0.4 (SEA753-0105252 to 273). 22 pages.

"IEEE Standard for Heterogeneous InterConnect (HIC) (Low-Cost, Low-Latency Scalable Serial Interconnect for Parallel System Construction)," Sep. 21, 1995, IEEE Std 1355-1995, IEEE Bus Architecture Standards Committee of the IEEE Computer Society, adopted by ISO/IEC and redesignated as ISO/IEC 14575:2000. 145 pages.

Complaint Under Section 337 of the Tariff Act of 1930, as Amended, in the Matter of Certain Semiconductor Chips and Products Containing Same. In United States International Trade Commission, Washington D.C. 20436. Investigation No. 337-TA-753, Dec. 1, 2010 for ITC Action Rel. Barth/Dally Patents, 238 pages. Appendices and Exhibits omitted except as otherwise cited herein.
Complaint for Patent Infringement and Jury Demand, dated Dec. 1, 2010, *RAMBUS Inc.* v. *Broadcom Corporation*. United States District Court Northern District of California, case No. 10-CV-05437-RS for ITC Action Rel. Barth/Dally Patents. 21 pages.
Complaint for Patent Infringement and Jury Demand, dated Dec. 1, 2010, *RAMBUS Inc.* v. *Freescale Semiconductor Inc.* United States District Court Northern District of California, case No. CV105445 for ITC Action Rel. Barth/Dally Patents. 21 pages.
Complaint for Patent Infringement and Jury Demand, dated Dec. 1, 2010, *RAMBUS Inc.* v. *LSI Corporation*. United States District Court Northern District of California, San Jose Division, case No. 10-CV-05446-JF for ITC Action Rel. Barth/Dally Patents. 20 pages.
Complaint for Patent Infringement and Jury Demand, dated Dec. 1, 2010, *RAMBUS Inc.* v. *MediaTek Inc.* United States District Court Northern District of California, case No. CV105447 for ITC Action Rel. Barth/Dally Patents. 14 pages.
Complaint for Patent Infringement and Jury Demand, dated Dec. 1, 2010, *RAMBUS Inc.* v. *NVIDIA Corporation*. United States District Court Northern District of California, case No. CV105448 for ITC Action Rel. Barth/Dally Patents. 10 pages.
Complaint for Patent Infringement and Jury Demand, dated Dec. 1, 2010, *RAMBUS Inc.* v. *STMicroelectronics N.V.; STMicroelectronics Inc.* United States District Court Northern District of California, case No. CV105449 for ITC Action Rel. Barth/Dally Patents. 20 pages.
*Rambus Inc.* v. *LSI Corporation*, LSI Corporation's Answer to Rambus Inc.'s Complaint for Patent Infringement and Counterclaims. United States District Court case No. 10-CV-05446-JF. Northern District of California, San Jose Division, Jan. 24, 2011 for ITC Action Rel. Barth/Dally Patents. 26 pages.
Discovery Statement of Respondent Garmin International, dated Jan. 25, 2011 re United States International Trade Commission, Washington DC Investigation No. 337-TA-753 in the Matter of Certain Semiconductor Chips and Products Containing Same for ITC Action Rel. Barth/Dally Patents. 11 pages.
Discovery Statement of Respondent Hitachi Global Storage Technologies, Inc., dated Jan. 25, 2011 re United States International Trade Commission, Washington DC Investigation No. 337-TA753 in the Matter of Certain Semiconductor Chips and Products Containing Same for ITC Action Rel. Barth/Dally Patents. 10 pages.
Discovery Statement of Hitachi Global Storage Technology, Inc., In the Matter of Certain Semiconductor Chips and Products Containing Same, re Investigation No. 337-TA-753, dated Jan. 25, 2011 for ITC Action Rel. Barth/Dally Patents. 27 pages.
Respondents' Joint Discovery Statement dated Jan. 25, 2011 re United States International Trade Commission, Washington DC Investigation No. 337-TA-753 in the Matter of Certain Semiconductor Chips and Products Containing Same. Encompassing responses from: Broadcom Corporation; NVIDIA Corporation; Freescale Semiconductor, Inc.; STMicroelectronics, Inc.; STMicroelectronics N.V.; MediaTek, Inc.; ASUSTek Computer, Inc.; Asus Computer International, Inc.; Biostar Microtech (U.S.A.) Corporation; Biostar Microtech International Corporation; Cisco Systems, Inc.; EliteGroup Computer System Co., Ltd. (ECS); EVGA Corporation; Galaxy Microsystems, Ltd.; Giga-Byte Technology Co., Ltd.; G.B.T., Inc.; Hewlett-Packard Company; Jaton Corporation; Jaton Technology TPE; Micro-Star International Co., Ltd.; MSI Computer Corporation; Gracom Technologies LLC; Oppo Digital, Inc.; Palit Microsystems, Ltd.; Pine Technology Holdings Ltd.; Sparkle Computer Co., Ltd.; Zotac USA; Inc.; and Zotac International (MCO), Ltd for ITC Action Rel. Barth/Dally Patents. 27 pages.
*Rambus Inc.* v. *Broadcom Corp*, Broadcom's Answer and Counterclaims, including Exhibits. United States District Court case No. 10-CV-05437-RS. Northern District of California, San Jose Division, Jan. 26, 2011 for ITC Action Rel. Barth/Dally Patents. 270 pages.
The Asus Respondents' Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 123 pages.

The Biostar Respondents' Response to Rambus Inc.'s Complaint and the Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.
Response of Broadcom Corporation to Complaint Under Section 337 of the Tariff Act of 1930, as Amended and Notice of Investigation including Exhibits re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 331 pages.
Response of Cisco Systems, Inc. to Complaint Under Section 337 of the Tariff Act of 1930, as Amended and Notice of Investigation including Exhibits re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 334 pages.
Respondent ECS's Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 120 pages.
Respondent EVGA's Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.
Respondent Galaxy's Response to Rambus Inc.'s Complaint and the Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.
Response to Complaint and Notice of Investigation by Respondent Garmin International, Inc. re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 135 pages.
Gigabyte Respondents' Response to Rambus Inc.'s Complaint and the Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.
Respondent Hewlett-Packard Company's Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 120 pages.
The Jaton Respondents' Response to Rambus Inc.'s Complaint and the Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.
Response of MediaTek Inc. To Complaint Under Section 337 of the Tariff Act of 1930, as Amended and Notice of Investigation including Exhibits re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 334 pages.
Response of Motorola Inc. To Complaint Under Section 337 of the Tariff Act of 1930, as Amended and Notice of Investigation re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 132 pages.

The MSI Respondents' Response to Rambus Inc.'s Complaint and the Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 120 pages.

Response of Oppo Digital, Inc. to Complaint Under Section 337 of the Tariff Act of 1930, as Amended and Notice of Investigation including Exhibits re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 333 pages.

The Palit Respondents' Response to Rambus Inc.'s Complaint and The Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 120 pages.

Respondent Pine Technology Holdings, Ltd.'s Response to Rambus Inc.'s Complaint and the Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 120 pages.

Respondent Sparkle Computer Co., Ltd.'s Response to Rambus Inc.'s Complaint and the Commission's Notice of Investigation including Exhibit re United States International Trade Commission, Washington DC in the Matter Investigation No. 337-TA-753 of Certain Semiconductor Chips and Products Containing Same, dated Feb. 1, 2011 for ITC Action Rel. Barth/Dally Patents. 121 pages.

The Zotac Respondents' Response to Rambus Inc.'s Complaint and the Commission's Notice of Investigation including Exhibit re United States International Trade Commission, Washington DC Investigation No. 337-TA-753 in the Matter of Certain Semiconductor Chips and Products Containing Same, dated Feb. 1, 2011 for ITC Action Rel. Barth/Dally Patents. 121 pages.

LSI Corporation's Response to Complaint Under Section 337 of the Tariff Act of 1930, as Amended, and to the Notice of Investigation Public Version re United States International Trade Commission, Washington DC Investigation No. 337-TA-753 in the Matter of Certain Semiconductor Chips and Products Containing Same, dated Feb. 2, 2011 for ITC Action Rel. Barth/Dally Patents. 118 pages.

Seagate's Technology's Response to Complaint Under Section 337 of the Tariff Act of 1930, as Amended, and to the Notice of Investigation, in the Matter of Certain Semiconductor Chips and Products Containing Same re Investigation No. 337-TA-753, dated Feb. 2, 2011 for ITC Action Rel. Barth/Dally Patents. 119 pages.

Granting Unopposed Motion Extending Time for Respondent Motorola, Inc.'s Response to Complaint and Notice of Investigation, in the Matter of Certain Semiconductor Chips and Products Containing Same re Investigation No. 337-TA-753, dated Feb. 3, 2011 for ITC Action Rel. Barth/Dally Patents. 4 pages.

Response of STMicroelectronics Inc. and STMicroelectronics N.V. to Complaint Under Section 337 of the Tariff Act of 1930, as Amended, and Notice of Investigation, in the Matter of Certain Semiconductors Chips and Products Containing Same re Investigation No. 337-TA-753, dated Feb. 4, 2011 for ITC Action Rel. Barth/Dally Patents. 119 pages.

Freescale Semiconductor, Inc.'s Answer to Rambus Inc.'s Complaint for Patent Infringement Demand for Jury Trial re Case No. C 10-05445 JF, in the United States District Court Northern District of California San Jose Division, dated Feb. 7, 2011 for ITC Action Rel. Barth/Dally Patents. 15 pages.

Respondent NVIDIA Corporation's Response to Rambus Inc.'s Complaint and The Commission's Notice of Investigation, in the Matter of Certain Semiconductor Chips and Products Containing the Same re Investigation No. 337-TA-753, dated Feb. 8, 2011 for ITC Action Rel. Barth/Dally Patents. 132 Pages.

Plaintiff and Counter-Defendant Rambus Inc.'s Answer to Defendant and Counterclaimant LSI Corporation's Counterclaims for Declaratory Judgment in the United States District Court Northern District of California San Jose Division re Case No. 10-05446 JF, dated Feb. 14, 2011 for ITC Action Rel. Barth/Dally Patents. 11 Pages.

Plaintiff and Counter-Defendant Rambus Inc.'s Answer to Defendant ad Counterclaimant Broadcom Corporation's Counterclaims for Declaratory Judgment, In the United States District Court Northern District of California San Jose Division re Case No. 3:10-cv-05437-RS, dated Feb. 16, 2011 for ITC Action Rel. Barth/Dally Patents. 25 pages.

STMicroelectronics N.V. and STMicroelectronics, Inc.'s Answer to Complaint and Counterclaims, In the United States District Court for the Northern District of California San Francisco Division re Case No. 3:10-cv-05449-RS, dated Mar. 1, 2011 for ITC Action Rel. Barth/Dally Patents. 23 pages.

MediaTek's Answer, in the United States District Court Northern District of California San Francisco Division re Case No. 3:10-CV-05447, dated Mar. 7, 2011 for ITC Action Rel. Barth/Dally Patents. 231 pages.

Plaintiff and Counter-Defendant Rambus Inc.'s Answer to Defendant and Counterclaimant STMicroelectronics N.V. and STMicroelectronics Inc.'s Counterclaims for Declaratory Judgment, in the United States District Court Northern District of California San Francisco Division re Case No. 3:10-cv-05449 RS, dated Mar. 22, 2011 for ITC Action Rel. Barth/Dally Patents. 8 pages.

Amended Response of STMicroelectronics Inc. and STMicroelectronics N.V. to Complaint Under Section 337 of the Tariff Act of 1930, as Amended, and Notice of Investigation, In the Matter of Certain Semiconductor Chips and Products Containing Same re Investigation No. 337-TA-753, dated May 20, 2011 for ITC Action Rel. Barth/Dally Patents. 125 Pages.

Objections and Responses to Respondents Broadcom, Mediateck, STMicroelectronics N.V., STMicroelectronics, Inc., and Nvidia's Corporate Notice of Deposition to Complainant Rambus Inc. (Topic Nos. 60-94), in the Matter of Certain Semiconductor Chips and Products Containing Same, re Investigation No. 337-TA-753, dated Jun. 26, 2011 for ITC Action Rel. Barth/Dally Patents. 29 pages.

Respondent Broadcom's Motion to Amend Their Responses to Complaint, In the Matter of Certain Semiconductor Chips and Products Containing Same, re Investigation No. 337-TA-753, dated Jul. 1, 2011 for ITC Action Rel. Barth/Dally Patents. 1543 pages.

PCI-SIG's Responses and Objections to Subpoena Duces Tecum and Subpoena Ad Testificandum From Respondents Broadcom Corp., STMicroelectronics N.V., STMicroelectronics, Inc., and nVidia Corp., In the Matter of Certain Semiconductor Chips and Products Containing Same, re Investigation No. 337-TA-753, dated Jul. 5, 2011 for ITC Action Rel. Barth/Dally Patents. 13 pages.

PCI-SIG's Responses and Objections to Subpoena Duces Tecum and Subpoena Ad Testificandum From Complainant Rambus, Inc., In the Matter of Certain Semiconductor Chips and Products Containing Same, re Investigation No. 337-TA-753, dated Jul. 5, 2011 for ITC Action Rel. Barth/Dally Patents. 17 pages.

Notice of Prior Art by Respondents Broadcom, MediaTek, STMicroelectronics N.V., STMicroelectronics, Inc., nVidia, Audio Partnership PLC., Asustek Computer Inc., Asus Computer International, Inc., Biostar Microtech (U.S.A.) Corp., Biostar Microtech International, Cisco Systems, Inc., EliteGroup Computer Systems Co. Ltd. (ECS), EVGA Corporation, Galaxy Microsystems Ltd., Garmin International, Inc., G.B.T., Inc., Gigabyte Technology Co., Ltd., Gracom Technologies LLC, Hewlett-Packard Co., Hitachi Global Storage Technologies, Inc., Jaton Corp., Jaton Technology TPE, Micro-Star International, Motorola Mobility, Inc., MSI Computer Corporation, Oppo Digital, Inc., Palit Microsystems Ltd., Pine Technology Holdings, Ltd., Sparkle Computer Co., Ltd., Zotac International (MCO) Ltd., and Zotac USA Inc., In the Matter of Certain Semiconductor Chips and Products Containing Same, re Investigation No. 337-TA-753, dated Jul. 5, 2011 for ITC Action Rel. Barth/Dally Patents. 37 pages.

Respondents' Notice of Prior Art, In the Matter of Certain Semiconductor Chips and Products Containing Same, re Investigation No. 337-TA-753, dated Jul. 5, 2011 for ITC Action Rel. Barth/Dally Patents. 39 pages.

Declaration of John Poulton dated Jul. 7, 2011 for ITC Action Rel. Barth/Dally Patents. 9 pages.

Rambus's Objections and Responses to Respondents Broadcom Corporation, nVidia Corporation, STMicroelectronics N.V., and STMicroelectronics, Inc.'s Fifth Set of Requests for Admission to Rambus (Nos. 496-712), In the Matter of Certain Semiconductor Chips and Products Containing Same, re Investigation No. 337-TA-753, dated Jul. 11, 2011 for ITC Action Rel. Barth/Dally Patents. 152 pages.

Expert Report of Dr. Robert Ellett Regarding Public Availability of Certain References, In the Matter of Certain Semiconductor Chips and Products Containing Same, re Investigation No. 337-TA-753, dated Jul. 20, 2011 for ITC Action Rel. Barth/Dally Patents. 34 pages.

Expert Report of R. Polk Wagner Concerning the Delay in the Prosecution of the Patents-At-Issue in the In Re Certain Semiconductor Chips and Products Containing Same Litigation, re Investigation No. 337-TA-753, dated Jul. 20, 2011 for ITC Action Rel. Barth/Dally Patents. 46 pages.

Respondents LSI and Seagate's Second Motion for Leave to Amend Their Tentative List of Witnesses, In the Matter of Certain Semiconductor Chips and Products Containing Same, re Investigation No. 337-TA-753, dated Jul. 29, 2011 for ITC Action Rel. Barth/Dally Patents. 188 pages.

First Rebuttal Expert Report of Andrew C. Singer, Ph.D. (Redacted), In the Matter of Certain Semiconductor Chips and Products Containing Same, re Investigation No. 337-TA-753, dated Aug. 2, 2011 for ITC Action Rel. Barth/Dally Patents. 171 pages.

Second Rebuttal Expert Report of Andrew C. Singer, Ph.D. (Redacted), In the Matter of Certain Semiconductor Chips and Products Containing Same, re Investigation No. 337-TA-753, dated Aug. 3, 2011 for ITC Action Rel. Barth/Dally Patents. 88 pages.

Respondents LSI and Seagate's Partial Withdrawal of Their Second Motion for Leave to Amend Their Tentative List of Witnesses (Motion Docket 753-064), In the Matter of Certain Semiconductor Chips and Products Containing Same, re Investigation No. 337-TA-753, dated Aug. 18, 2011 for ITC Action Rel. Barth/Dally Patents. 21 pages.

Complainant Rambus Inc.'s Objections to Respondents' Proposed Corrected Direct Exhibit List, In the Matter of Certain Semiconductor Chips and Products Containing Same, re Investigation No. 337-TA-753, dated Sep. 14, 2011 for ITC Action Rel. Barth/Dally Patents. 300 pages.

Complainant's Proposed Rebuttal Exhibit List, In the Matter of Certain Semiconductor Chips and Products Containing Same, re Investigation No. 337-TA-753, dated Sep. 16, 2011 for ITC Action Rel. Barth/Dally Patents. 183 pages.

Respondents' Tentative Rebuttal Exhibit List, In the Matter of Certain Semiconductor Chips and Products Containing Same, re Investigation No. 337-TA-753, dated Sep. 16, 2011 for ITC Action Rel. Barth/Dally Patents. 81 pages.

Motion for Receipt of Evidence Without a Sponsoring Witness and Motion for Leave to File Same on Sep. 28, 2011, In the Matter of Certain Semiconductor Chips and Products Containing Same, re Investigation No. 337-TA-753, dated Sep. 27, 2011 for ITC Action Rel. Barth/Dally Patents. 97 pages.

National Semiconductor Product Folder, "CLC014, Adaptive Cable Equalizer for High Speed Data Recovery," Feb. 26, 1997, pp. 1-3.

National Semiconductor Product Folder, "Comlinear CLC014, Adaptive Cable Equalizer for High-speed Data Recover," Aug. 1996, pp. 1-12.

De Man, Hugo J. et al., "High-speed NMOS Circuits for ROM-Accumulator and Multiplier Type Digital Filters," IEEE Journal of Solid-State Circuits, vol. SC-13, No. 5, Oct. 1978, pp. 565-572.

Fledler, Alan et al., "PF 15:1: A 1.0625Gbps Transceiver with 2X-Oversampling and Transmit Signal Pre-Emphasis," IEEE International Solid-State Circuits Conference, Feb. 7, 1997, pp. 238-239.

Schröder, Hartmut, "High Word-Rate Digital Filters with Programmable Table Look-Up," IEEE Transactions on Circuits and Systems, May 1997, pp. 277-279.

Daily, William J. et al., "Transmitter Equalization for 4-Gbps Signaling," IEEE Micro, vol. 17, No. 1, Jan.-Feb. 1997, pp. 48-56.

Holte, et al., "A New Digital Echo Canceler for Two-Wire Subscriber Lines," IEEE Transactions on Communications, vol. COM-29, No. 11, pp. 1573-1581 (Nov. 1981).

Forney, et al., "Combined Equalization and Coding Using Precoding," IEEE Communications Magazine, pp. 25-34 (Dec. 1991).

Kobayashi, "Coding Schemes for Reduction of Intersymbol Interface in Data Transmission Systems," IBM J. Res. Develop., Reduction of Intersymbol Interference, pp. 343-353 (Jul. 1970).

Vanderaar, et al., "Transmit Pulse Shaping Filters and Cordic Algorithm Based Precompensation for Digital Satellite Communications," IEEE, pp. 1219-1222, (1997).

Fielder, et al., "A 1.0625Gbps Transceiver with 2x-Oversampling and Transmit Signal Pre-Emphasis," 1997 IEEE International Solid-State Circuits Conference, Session 15, pp. 238-239, 464 (Feb. 7, 1997).

Ginzburg, et al., "FDDI over Unshielded Twisted Pairs," IEEE, pp. 395-398 (1990).

Shih, et al., "10 Mb-s Twisted Pair CMOS Transceiver with Transmit Waveform Pre-Equalization," IEEE 1991 Custom Integrated Circuits Conference, pp. 7.3.1-7.3.4 (1991).

Dally, William J., et al., "Transmitter Equalization for 4Gb-s Signaling," Hot Interconnects IV, 10 pgs. (1996).

Komizo, et al., "A 7 GHz FM Transmitter Utilizing GaAs Power MESFETS," *IEEE*; vol. 77, issue 1, pp. 243-245 (Jun. 1977).

Wang, et al., "A Monolithic *Ka*-Band 0.25-µm GaAs MESFET Transmitter for High Volume Production," *IEEE Journal of Solid-State Circuits*; vol. 27, No. 10, pp. 1397-1404 (Oct. 1992).

Raffaelli, et al., "A Low Cost 77 GHz Monolithic Transmitter for Automotive Collision Avoidance Systems," *IEEE Microwave and Millimeter-Wave Monolithic Circuits Symposium*; pp. 63-66 (Jun. 14-15, 1993).

U.S. Office Action dated Nov. 10, 2008 for U.S. Appl. No. 11/514,515.

U.S. Office Action dated Dec. 5, 2008 for U.S. Appl. No. 11/514,552.

U.S. Office Action dated Feb. 4, 2009 for U.S. Appl. No. 11/514,577.

U.S. Office Action dated Mar. 19, 2009 for U.S. Appl. No. 11/514,637.

U.S. Office Action dated Mar. 19, 2009 for U.S. Appl. No. 11/514,510.

U.S. Office Action dated Apr. 6, 2009 for U.S. Appl. No. 11/514,735.

U.S. Notice of Allowance dated Aug. 20, 2009 for U.S. Appl. No. 11/514,577.

U.S. Notice of Allowance dated Aug. 28, 2009 for U.S. Appl. No. 11/514,460.

U.S. Appl. No. 12/491,033, filed Jun. 24, 2009, by William J. Dally.

U.S. Office Action dated Nov. 17, 2009 for U.S. Appl. No. 11/514,637.

Notice of Allowance dated Feb. 18, 2010 for U.S. Appl. No. 11/514,510.

Notice of Allowance dated Mar. 23, 2010 for U.S. Appl. No. 11/514,637.

Notice of Allowance dated Jul. 6, 2010 for U.S. Appl. No. 11-514,735.

DP83902A ST-NIC, "Serial Network Interface Controller for Twisted Pair", National Semiconductor, Preliminary Nov. 1995, datasheet. 70 Pages.

Notice of Allowance and Fees Due, dated May 17, 2011, for U.S. Appl. No. 11/514,735, consisting of 12 pages.

Numata, Kenji et. al., "New Nibbled-Page Architecture for High Density DRAM's," IEEE Journal of Solid State Circuits, vol. 24 No. 4, pp. 900-904 (Aug. 1989). 6 pages.

Williams et al., "An Experimental 1-Mbit CMOS SRAM with Configurable Organization and Operation," IEEE Journal of Solid State Circuits, vol. 23, No. 5, pp. 1085-1094 (Oct. 1988). 10 pages.

Anceau, Francois, "A Synchronous Approach for Clocking VLSI Systems," IEEE Journal of Solid-State Circuits, vol. SC-17, No. 1, pp. 51-56 (Feb. 1982). 6 pages.

Gustavson et al., "The Scalable Coherent Interface Project (Superbus)," SCI Aug. 22, 1988, Draft, Rev. 14. 16 pages.

Knut, Alnes, "SCI: A Proposal for SCI Operation," SCI—Jan. 6, 1989—doc31, Norsk Data, Oslo, Norway, p. 1-24, Jan. 6, 1989. 23 pages.

Minutes of Meeting No. 75 JEDEC JC-42.3 Committee on RAM Memories, and referenced attachment "Y" of the presentation titled "SyncLink", May 24, 1995, New Orleans. 14 pages.

Schanke, Morten, "Proposal for Clock Distribution in SCI", SCI-B [1 and SCI 2], May 5, 1989. 5 pages.

Lee, Thomas H., "A. 2.5 V CMOS Delay-Locked Loop for an 18 Mbit, 500 Megabyte/s DRAM," IEEE Journal, vol. 29, No. 12, Dec. 1994. 6 pages.

Hansen, Craig et al., "A RISC Microprocessor with Integral MMU and Cache Interface," MIPS Computer Systems, Sunnyvale, CA, IEEE 1986, p. 145-148. 4 pages.

Frank, Edward H., "The SBUS: Sun's High Performance System Bus for RISC Workstations," IEEE pp. 189-194, Sun Microsystems Inc. 1990. 6 pages.

Przybyliski, Steven A., "New DRAM Technologies, A Comprehensive Analysis of the New Architectures," pp. iii-iv, 119-21, 138-158, 177-203 (MicroDesign Resource 1994). 60 pages.

Texas Instruments, Inc., "TMS626402, 2097 152-Word By 2-Bank Synchronous Dynamic Random-Access Memory," Feb. 1994, pp. 5-3-5-23. 12 pages.

LSI Logic Preliminary Datasheet, "LR2000 High Performance RISC Microprocessor," Sep. 1988, (w/reference page). 16 pages.

Bakka, Bjorn, et al., "SCI: Logical Level Proposals—Working Paper," SCI-6Jan-89-doc31, Norsk data, Oslo, Norway, pp. 1-24, Jan. 6, 1989. 20 pages.

Widmer, et al., "A DC-Balanced, Partitioned-Block, 8B/10B Transmission Code," IBM J. Res. Develop., vol. 27, No. 5, Sep. 1983, pp. 440-451. 12 pages.

Knut Alnes, "SCI: A Proposal for SCI Operation," SCI-10Nov88-doc23, Norsk Data Report, Oslo, Norway, pp. 1-12, Nov. 10, 1988. 14 pages.

Mitsubishi Electric, "M5M4V16807ATP-10, -12, -15, Target Spec." (Rev. 0.3), May 7, 1993, p. 1-36. 37 pages.

Rau et al., "The Cydra 5 Departmental Supercomputer Design Philosophies, Decisions, and Trade-offs," Computer IEEE, Jan. 1989 pp. 12-35 (w/cover & title page). 22 pages.

Moussouris, John P. "The Advanced Systems Outlook—Life Beyond RISC: The Next 30 years in High-Performance Computing," Computer Lettter, Jul. 31, 1989 (an edited excerpt from an address at the fourth annual conference on the Advanced Systems Outlook, in San Francisco, CA (Jun. 5). 10 pages.

Mosys, "MD904 to MD920, Multibank DRAM (MDRAM) 128K×32 to 656K×32," Datasheet, Document DS01-2.1, MoSys Inc. California, Dec. 18, 1995, pp. 1-14. 14 pages.

Minutes of meeting and presentations made at JC-42.3 Committee on Ram Memories, Meeting No. 59, Sep. 18, 1991, Philadelphia. 102 pages.

Kushiyama, Natsuki et al, "A 500-Megabyte/s Data-Rate 4.5M DRAM" IEEE Journal of Solid State Circuits, IEEE Service Center, Piscataway, NJ, US, vol. 28, No. 4, Apr. 1, 1993, pp. 490-498, XP000362979 ISSN: 0018-9200.

LSI Logic Preliminary Datasheet, "LR2010 Floating-Point Accelerator," Nov. 1988. 20 pages.

Ohta, Kiyoto, "A 1-Mbit DRAM with 33-MHz Serial I/O Ports," IEEE Journal of Solid State Circuits, vol. 21, No. 5, pp. 649-654 (Oct. 1986). 6 pages.

Minutes of meeting and presentations made at JC-42.3 Committee on RAM Memories, Meeting No. 65, Dec. 9-10, 1992, Ft. Lauderdale, FL. 6 pages.

Jeremiah et al., "Synchronous LSSD Packet Switching Memory and I/O Channel," IBM Tech. Disc. Bul,. vol. 24, No. 10, pp. 4986-4987 (Mar. 1982). 2 pages.

English Translation of Notice of the Reason for Refusal, Patent Application No. JP500879/95, mailed Sep. 21, 2004. 4 pages.

James, David, "Scalable I/O Architecture for Buses," IEEE pp. 539-544 (Apr. 1989). 8 pages.

Minutes of meeting and presentations made at JC-42.3 Committee on Ram Memories, Meeting No. 72, Sep. 13, 1994, Albuquerque NM. 56 pages.

Minutes of meeting and presentations made at JC-42.3 Committee on Ram Memories, Meeting No. 76, Sep. 11, 1995, Crystal City, VA. 43 pages.

Minutes of meeting and presentations made at JC-42.3 Committee on Ram Memories, Meeting No. 58, May 9, 1991, Anchorage AK. 30 pages.

American National Standard for Information Systems, "Fibre Channel—Physical and Signaling Interface (FC-PH) Rev. 4.3" proposed working draft, Jun. 1, 1994. 478 pages.

Kuriyama, Hirotada et al., "A 4-Mbit CMOS SRAM with 8-NS Serial Access Time," IEEE Symposium on VLSI Circuits Digest of Technical Papers, pp. 51-52 (Jun. 1990). 2 pages.

"High Speed CMOS Databook", Integrated Device Technology Inc., Santa Clara, CA, p. 9-1 to 9-14, 1988. 12 pages.

Micron Semiconductor, Inc. "MT4LC4M4E9 (S) 4 Meg×4 DRAM," 1994, pp. 1-183-1-196. 14 pages.

Kalter et al., "A 50-ns. 16Mb DRAM with a 10-ns Data Rate and On-Chip ECC," IEEE Journal of Solid State Circuits, vol. 25, No. 5, pp. 1118-1128 (Oct. 1990). 11 pages.

Minutes of meeting and presentations made at JC-42.3 Committee on RAM Memories, Meeting No. 62 May 7, 1992 New Orleans, LA. 115 pages.

Knut, Alnes, "Scalable Coherent Interface," SCI-Feb89-doc52, (To appear in Eurobus Conference Proceedings May 1989) pp. 1-8. 8 pages.

Lee et al., "A CMOS Serial Link for Fully Duplexed Data Communication," IEEE Journal of Solid-State Circuits, vol. 30, No. 4, pp. 353-364, (Apr. 1995). 12 pages.

Minutes of meeting and presentations made at JC-42.3 Committee on Ram Memories, Meeting No. 64, Sep. 16-17, 1992, Crystal City, VA. 86 pages.

Farmwald, M. et al., (Rambus Inc.) "A fast path to one memory," IEEE Spectrum, Oct. 1992, pp. 50-51. 2 pages.

PCT Invitation to Pay Additional Fees with Communication Relating to the Results of the Partial International search, mailed Apr. 21, 1997, for counterpart PCT Application No. PCT/US96/16835. 4 pages.

James, David V., "Scalable I/O Architecture for Buses," COMPCON Spring 1989, SCI, Nov. 28, 1988. 7 pages.

Moussouris, John P., "A CMOS Processor with Integrated Systems Functions," MIPS Computer Systems, Sunnyvale, CA, IEEE 1986, p. 126-130. 12 pages.

Minutes of meeting and presentations made at JC-42.3 Committee on Ram Memories, Meeting No. 66, Mar. 3-4, 1993, Scottsdale AZ. 84 pages.

Rambus Inc., "Architectural Overview," Rambus Inc., 1992, pp. 1-23. 23 pages.

Architectural Overview, Rambus Inc. Publication No. DL0001-02, 1993, pp. 1-24. 24 pages.

Lee, Thomas H., et al., "A 155-MHZ Clock Recovery Delay- and Phase-Locked Loop," pp. 421-430, Reprinted from IEEE Journal of Solid-State Circuits, vol. SC-27, pp. 1736-1746 (Dec. 1992). 10 pages.

Watanabe, S. et al., "An Experimental 16-Mbit CMOS DRAM Chip with a 100-MHz Serial Read/Write Mode," IEEE Journal of Solid State Circuits, vol. 24, No. 3, p. 763, Jun. 1982. 8 pages.

Fielder et al., "A 3 NS 1K×4 Static Self-Timed GaAs RAM," IEEE Gallium Arsenide Integrated Circuit Symposium Technical Digest, pp. 67-70 (Nov. 1988) (w/Title of Conference and copywrite page). 6 pages.

Lee, M.E., et al., "Low-Power Area-Efficient High-Speed I/O Circuit Techniques," IEEE J. of Solid State Circuits, vol. 35, No. 11, Nov. 2000, pp. 1591-1599. 10 pages.

Minutes of meeting and presentations made at JC-42.3 Committee on Ram Memories, Jan. 17, 1995, San Jose CA. 39 pages.

Hidaka, Hideto at al., "The Cache DRAM Architecture: A DRAM with an On-Chip Cache Memory," IEEE Micro, vol. 10, No. 2, Apr. 1990, pp. 14-25. 14 pages.

Kushiyama, N. et al., "500 Mbyte/sec Data-Rate 512 Kbits×9 DRAM Using a Novel I/O Interface," 1992 Symposium on VLSI Circuits Digest of Technical Papers, 1992. 2 pages.

JEDEC Standard No. 21-C Release 4, Configurations for Solid State Memories, Electronic Industries Association, Nov. 1993. 183 pages.

Lee et al., "A 2.5V Delay-Locked Loop for an 18Mbit, 500 Megabyte/s DRAM,"Solid State Circuits Conference, Digest of Technical Papers, 41st ISSCC International, Feb. 1994, pp. 300-301, 357. 3 pages.

Motorola, "Motorola MC88200 Cache/Memory Management Unit User's Manual," Second Edition, Prentice Hall (1988). 122 pages.

"1989 GaAs IC Data Book & Designers Guide," Gigabit Logic Inc. (Aug. 1989). 85 pages.

Siemens AG, "Siemens ICs for Entertainment Electronics Picture-in-Picture System," Siemens Edition, Aug. 1989. 36 pages.
Oshima, Shigeo et al., "High Speed DRAMs with Innovative Architectures," IEICE Trans. Electron, vol. E77-C, No. 8, pp. 1303-1315 Aug. 1994, (Exhibit F). 14 pages.
Supplemental Information Disclosure Statement dated Jun. 2, 2011 re U.S. Appl. No. 13/090,507. 5 Pages.
Supplemental Information Disclosure Statement dated Jun. 2, 2011 re U.S. Appl. No. 13/091,382. 5 Pages.
Supplemental Information Disclosure Statement dated Jun. 2, 2011 re U.S. Appl. No. 13/027,893. 5 Pages.
Supplemental Information Disclosure Statement dated Jun. 2, 2011 re U.S. Appl. No. 12/942,607. 5 Pages.
Supplemental Information Disclosure Statement dated Jun. 2, 2011 re U.S. Appl. No. 12/571,582. 5 Pages.
Supplemental Information Disclosure Statement dated Jun. 2, 2011 re U.S. Appl. No. 12/491,033. 5 Pages.
Respondents' Notice of Prior Art dated Jul. 5, 2011, Investigation No. 337-TA-753. 39 Pages.
Respondents' Notice of Prior Art dated Jul. 5, 2011, Investigation No. 337-TA-753. 37 Pages.
Tewksbury, Stuart K., "Wafer-Level Integrated Systems: Implementation Issues," Kluwer Academic Publishers, 1989. 459 pages.
Fields, Kari, "10-bit Interface TR Project," 1996, Document JNT0026672-JNT0026673, found online on Jul. 2, 2011 at http://www.t11.org/t11/stat.nsf/1158203694fa939f852566dc0049e810/9acfccd97c91b56385 . . . 2 pages.
Yang, et al., "A 08-um CMOS 2.5 Gb/s Oversampling Receiver and Transmitter for Serial Links," IEEE Journal of Solid-State Circuits, vol. 31, No. 12, Dec. 1996, pp. 2015-2023. 9 pages.
Meyr, H. et al., "Research Report, Manchester coding with Predistortion: An Efficient and Simple Transmission Technique in Local Digital Ring Networks", RZ 1042 (#37178) Oct. 27, 1980 Communications, 23 Pages.
Chen, et al., "A 1.25 Gb/s, 460m W CMOS Transceiver for Serial Data Communication," ISSCC97, Session 15, Serial Data Communications, Paper FP 15.3, pp. 242-243, 465. 3 pages.
Ewen, John F., et al., "Single-Chip 1062Mbaud CMOS Transceiver for Serial Data Communication" ISSCC95/Session 2/Data Communications/Paper WP 2.1 dated Feb. 15, 1995. 3 Pages.
Chiang, et al., "A 20 Gbs 0.13-um CMOS Serial Link Transmitter Using an LC-PLL to Directly Drive the Output Multiplexer," IEEE Journal of Solid-State Circuits, vol. 40, No. 4, Apr. 2005, pp. 1004-1011. 8 pages.
Yamamoto, et al., "A Front-End Processor for Modems," IEEE Journal of Solid-State Circuits, vol. 24, No. 6, Dec. 1989, pp. 1634-1638. 5 pages.
Levy, et al., "A Single-Chip 5-V 2400-b/s Modem," IEEE Journal of Solid-State Circuits, vol. 25, No. 3, Jun. 1990, pp. 632-643. 12 pages.
Widmer, Albert, et al, "A Single-Chip 4X500 Mbaud CMOS Transceiver", ISSCC96/Session 7/ATM/SONET/Paper F17.7 7 Pages.
Marbot, Roland, et al., "SP25.2: Serial Networks for Computing Applications", 1996 IEEE International Solid-State Circuits Conference. 3 Pages.
Widmer, A.X., Predistorting Transmission Line Driver, IMB Technical Disclosure Bulletin, vol. 18, No. 3 Aug. 1975. 6 Pages.
Deutsch, A., et al, "Performance Limits of Electrical Cables for Intrasystem Communication", IBM Journal of Research and Development, vol. 38, No. 6, Nov. 1994. 16 Pages.
Batruni, Roy et al., "Mixed Digital/Analog Signal Processing for a Single-Chip 2B1Q U-Interface Transceiver", IEEE Journal of Solid-State Circuits, vol. 25, No. 6, Dec. 1990. 12 Pages.
Walker, et al., "A Two-Chip 1.5-GBd Serial Link Interface," IEEE Journal of Solid-State Circuits, vol. 27, No. 12, Dec. 1992, pp. 1805-1811. 7 pages.
AMD, "Am79C98 Twisted-Pair Ethernet Transceivers (TPEX)," Publication # 14395, Rev D, May 1994. 22 pages.
Haykin, Simon, "An Introduction to Analog and Digital Communications," John Wiley & Sons, 1989. 89 pages.
Burlage, et al., "Applications of Linear Programming to the Time-Domain Design of Digital-Filter Equalizers," IEEE Transactions on Communications, Dec. 1973, from the International Conference on Communications, Philadelphia, PA, 1972. 6 pages.

Lee, et al., "Digital Communication," 1st Edition, Kluwer Adademic Publishers, Boston, MA, 1988. 731 pages.
Lee, et al., "Digital Communication," 2nd Edition, Kluwer Adademic Publishers, Boston, MA, 1994. 910 pages.
Proakis, John G., "Digital Communications," 3rd Edition, McGraw-Hill, Inc. 1995. 30 pages.
Bissell, et al., "Digital Signal Transmission," Cambridge University Press, 1992. 126 pages.
Draft Proposed X3 Technical Report, "Fibre Channel—10-bit Interface," ANSI TR/X3.18-199x, Information Technology Industry Council, May 30, 1996. 17 pages.
Fields, Kari, "FC-PH Project," 1994, printed from http://www.t11.org/t11/stat.nsf/ . . . on Jul. 2, 2011. 2 pages.
Rocchi, Marc (ed.), "High-Speed Digital IC Technologies," Artech House, Inc., Norwood, MA, 1990. 74 pages.
"IEEE Standard for Heterogeneous InterConnect (HIC) (Low-Cost, Low-Latency Scalable Serial Interconnect for Parallel System Construction)," IEEE Std 1355-1995, Bus Architecture Standards Committee of the IEEE Computer Society, Sep. 21, 1995. 144 pages.
IEEE Standards for Local and Metropolitan Area Networks: Supplement to Carrier Sense Multiple Access with Collision Detection (CSMA/CD) Access Method and Physical Layer Specifications, "Media Access Control (MAC) Parameters, Physical Layer, Medium Attachment Units, and Repeater for 100 Mb/s Operation, Type 100BASE-T (Clauses 21-30)," IEEE Std 802.3U-1995, LAN MAN Standards Committee of the IEEE Computer Society, approved Jun. 14, 1995. 415 pages.
Marbot et al., "Integration of Multiple Bidirectional Point-to-Point Serial Links in the Gigabits per Second Range," Aug. 5-7, 1993, Hot Interconnects Symposium 1993. 22 pages.
Motorola, "MC68302 Integrated Multiprotocol Processor User's Manual," 1991, Rev. 2, Second Edition, from the Library of the University of California at Santa Barbara. 544 pages.
Motorola, "M68000 8-/16-/32-Bit Microprocessors User's Manual," 1993, Ninth Edition, Freescale Semiconductor, Inc. 189 pages.
Liu, Yu-Cheng, "The M68000 Microprocessor Family, Fundamentals of Assembly Language Programming & Interface Design," 1991, Prentice-Hall, Inc. 462 pages.
Geimer, Rick, "Hitachi Single-Chip RISC Micro-computer SH7032 and SH7034 HD6417032, HD6477034, HD6437034 Hardware Manual," Jun. 9, 1995, Hitachi Micro Systems, Incorporated. 614 pages.
Bull Serial Link Technology Strings, "Bullit—Data Sheet v2.0," May 1995, 3.3V version, First Release D1.0a. 55 pages.
"VMEbus Specification Manual," Revision C.1, Oct. 1985, Third Printing. 220 pages.
NeXT, "NextBus Interface Chip Specification," 1990. 142 pages.
LSI Logic, "SL300 High-Speed Serializer/Deserializer Technical Manual," May 1995. 67 pages.
NeXT, Inc., "NextBus Specification," 1990. 81 pages.
Oster et al., "Overview of the Hitachi SH7000 Series Single-Chip RISC Microcomputer," Feb. 1, 1994, Hitachi Micro Systems, Incorporated. 115 pages.
Cuppu et al., "A Performance Comparison of Contemporary DRAM Architectures," May 1999, In Proc. 26th Annual International Symposium on Computer Architecture (ISCA '99), Atlanta, GA, 222-233. 12 pages.
Anderson et al., "The IBM System/360 Model 91: Machine Philosophy and Instruction—Handling," Jan. 1967, IBM Journal of Research and Development, vol. 11, No. 1, pp. 8-24. 17 pages.
Ramamurthy, Krishnan, "SeriaLink 500K Technology Core Specification," May 1, 1995, Rev. 1.0, LSI Logic, Computer Products Division, Serial Link Design Engineering. 18 pages.
IEEE, "Draft Standard for a High-Speed Memory Interface (SyncLink)," Draft 0.5 IEEE P1596.x-199x, 1995. 68 pages.
Miller, Marc, "CWSL300 Development Status," (LSI SeriaLink Presentation) May 3, 1995, LSI Logic, Computer Products DivisionSEA753-0104715 to 725. 11 pages.
Widmer et al., "Single-Chip 4×500-MBd CMOS Transceiver," IEEE Journal of Solid-State Circuits, vol. 31, No. 12, Dec. 1996, pp. 2004-2014. 11 pages.
IEEE Std 1802.3-1991, "Conformance Test Methodology for IEEE Standards for Local and Metropolitan Area Networks: Carrier Sense Multiple Access with Collision Detection (CSMA/CD) Access Method and Physical Layer Specifications," Mar. 21, 1991. 35 pages.
Rambus Inc., "Corporate Backgrounder," Mar. 1992, Special Confidential, (JNT0013041 to 64). 24 pages.
LSI Logic, "CoreWare SeriaLink Core" Brochure, 1995. 4 pages.
P1596: SCI, A Scalable Coherent Interface, "Bus Specification Components," Nov. 28, 1988, SCI-28Nov88-doc2.p1, (JNT0010069 to 93). 25 pages.
Cataldo, Anthony, "Siemens to manufacture, market MoSys DRAMs," May 22, 1995, Electronic News, (JNT0022344 to 45). 2 pages.
Davis et al., "The New DRAM Interfaces: SDRAM, RDRAM and Variants," 2000, In High Performance Computing, vol. 1940 of Lecture Notes in Computer Science, pp. 26-31, Springer-Verlag Publishing, Tokyo, Japan. 6 pages.
Kristiansen et al., "Scalable Coherent Interface," SCI-Sep89-doc102, Sep. 1989, Eurobus, London, (JNT0010118 to 125). 8 pages.
Slater, Michael, "Rambus Unveils Revolutionary Memory Interface, Rambus Channel Provides 500 Mbyte/s Memory Interface," Mar. 4, 1992, Microprocessor Report, pp. 15-21. 5 pages.
Przybylski, Stevem, "DRAMs for New Memory Systems (Part 3): New Designs to Play Strong Role in Next-Generation Systems," Mar. 29, 1993, Microprocessor Report, pp. 22-26. 5 pages.
Przybylski, Steven, "New DRAMs Improve Bandwidth (Part 1): SDRAMs, CDRAMs, and EDRAMs Illustrate Evolutionary Approach," Feb. 15, 1993, Microprocessor Report, pp. 18-21. 4 pages.
Gustavson, David B., "The Scalable Coherent Interface, IEEE P1596, Status and Possible Applications to Data Acquisition and Physics*," Jan. 1990, SLAC-Pub-5119, I-IV, Presented at the IEEE Nuclear Science Symposium, San Francisco, CA on Jan. 15-19, 1990. 4 pages.
Przybylski, Steven, "DRAMs for New Memory Systems (Part 2): Rambus, Ramlink Offer Revolutionary New Interfaces," Mar. 8, 1993, Microprocessor Report, pp. 18-21. 4 pages.
Gustavson, David B., "Scalable Coherent Interface," Nov. 1988, SCI-28Nov88-doc20, SLAC-Pub-4798, Invited paper presented at COMPCON Spring '89, San Francisco, CA on Feb. 27-Mar. 3, 1989. 3 pages.
LSI Logic, "CoreWare SeriaLink CWSL500 Core Datasheet," 1995. 4 pages.
Lee, Thomas H. et al., "FA18.6: A 2.5V Delay-Locked Loop for an 18Mb 500MB/s DRAM," 1994, ISSCC94, Session 18, High-Performance Logic and Circuit Techniques, Paper FA 18.6, pp. 236-237, 239, 330. 4 pages.
Thornton, J.E., "Design of a Computer: The Control Data 6600," 1970, Scott, Foresman and Company, Glenview, IL., JNT0031249-349. 101 pages.
Kalter, Howard, "High Speed Toggle for Microprocessor Applications," DRAM Task Group, Sep. 17, 1990, JEDEC JC-42.3, Denver, Colorado, JNT0022352-357. 6 pages.
Przybylski, Steven A., "New DRAM Technologies: A Comprehensive Analysis of the New Architectures," 1994, MicroDesign Resources, Sebastopol, CA, pp. 119-121, 138-158, 177-200, 202-203, JNT0028042-097. 56 pages.
Horowitz, Mark, et al., "TP 10.5: PLL Design for a 500 MB/s Interface," 1993, ISSCC93, Session 10, High-Speed Communication and Interfaces, Paper TP 10.5, pp. 160-161, 282, JNT0020098-100. 3 pages.
"Documents related to National Semiconductor DP83902, DP83840, and DP83840A (NSC-75300001 to 2472," Mar. 6, 1995 ("National Semiconductor Rolls Out the Industry's First VLSI Fast Ethernet Solutions with Auto-Negotiation"), found online at The Free Library by Farlex on Jun. 28, 2011, JNT0025757-759. 3 pages.
IBM, "Presentations made by Michael Clinton and Mark Kellogg at the internal IBM 'High Bandwidth DRAM Meeting' held on or about Mar. 23-24, 1992 (LSI753-0469497 to 505)," Apr. 2, 1992, JNT0020071-079. 9 pages.
"JEDEC Meeting Minutes of JC-42.3—All Meetings," Meeting No. 60 (Dec. 4-5, 1991), Meeting No. 61 (Feb. 27-28, 1992), Meeting No. 62 (May 7, 1992). 587 pages.
English Abstract and brief description for JP61-160556U published Oct. 4, 1986. 13 pages.
Notice of Allowance dated Nov. 14, 2011 for U.S. Appl. No. 12/491,033.
Office Action dated Nov. 22, 2011 for U.S. Appl. No. 12/571,582.
Respondent Hitachi Global Storage Technologies, Inc.'s Second Supplemental Objections and Responses to Complainant's First Set of Interrogatories to Respondent Hitachi Global Storage Technologies, Inc. (Nos. 12, 24, 28, 31, 34 and 51), In the Matter of Certain Semiconductor Chips and Products Containing Same re Investigation No. 337-TA-753, dated Jun. 8, 2011 for ITC Action Rel. Barth/Dally Patents. 24 Pages.
Respondent nVidia Corporation's First Supplemental Objections and Responses to Rambus Inc.'s Third Set of Interrogatories (Nos. 75-76), In the Matter of Certain Semiconductor Chips and Products Containing Same, re Investigation No. 337-TA-753, dated Jun. 20, 2011 for ITC Action Rel. Barth/Dally Patents. 18 pages.
Rambus Inc.'s Supplemental Response to Broadcom Corporation Interrogatory No. 8, In the Matters of Certain Semiconductor Chips and Products Containing Same, re Investigation No. 337-TA-753, dated Jun. 20, 2011 for ITC Action Rel. Barth/Dally Patents. 8 pages.
Dally, William, U.S. Appl. No. 12/571,582, filed Oct. 1, 2009, re Office Action mailed Nov. 22, 2011. 38 pages.
Dally, William, U.S. Appl. No. 13/027,893, filed Feb. 15, 2011, re Office Action mailed Dec. 14, 2011. 38 pages.
Dally, William, U.S. Appl. No. 13/090,507, filed Apr. 20, 2011, Office Action mailed Jan. 11, 2012. 45 pages.
Dally, William, U.S. Appl. No. 13/091,382, filed Apr. 21, 2011, Preliminary Amendment submitted Feb. 13, 2012. 18 pages.
Dally, William, U.S. Appl. No. 12/571,582, filed Oct. 1, 2009, Response dated Feb. 21, 2012 to the Office Action of Nov. 22, 2011. 18 pages.
Dally, William, U.S. Appl. No. 12/571,582, filed Oct. 1, 2009, Notice of Allowance and Fee(s) Due mailed Mar. 2, 2012. 18 pages.
Dally, William, U.S. Appl. No. 12/491,033, filed Jun. 24, 2009, Notice of Allowance and Fee(s) Due mailed Feb. 23, 2012. 19 pages.
Initial Determination on Violation of Section 337 and Recommended Determination on Remedy and Bond mailed Mar. 16, 2012, re Investigation No. 337-TA-753, dated Jun. 8, 2011 for ITC Action Rel. Barth/Dally Patents. 386 pages.
Rambus Inc.'s Objections and Responses to Freescale Semiconductor, Inc.'s First Set of Interrogatories (Nos. 1-93) Redacted Mar. 16, 2012 re United States International Trade Commission, Washington DC Investigation No. 337-TA-753 in the Matter of Certain Semiconductor Chips and Products Containing Same, dated Jan. 26, 2011 for ITC Action Rel. Barth/Dally Patents. 8 pages.
Respondent Hitachi Global Storage Technologies, Inc.'s Second Supplemental Objections and Responses to Complainant's First Set of Interrogatories to Respondent Hitachi Global Storage Technologies, Inc. (Nos. 12, 24, 28, 31, 34 and 51) Redacted on Mar. 16, 2012, In the Matter of Certain Semiconductor Chips and Products Containing Same re Investigation No. 337-TA-753, dated Jun. 8, 2011 for ITC Action Rel. Barth/Dally Patents. 7 Pages.
Rambus Inc.'s Supplemental Responses to Broadcom Corporation's Interrogatories, Redacted on Mar. 20, 2012, In the Matter of Certain Semiconductor Chips and Products Containing Same re Investigation No. 337-TA-753, dated Jun. 8, 2011 for ITC Action Rel. Barth/Dally Patents. 3 Pages.
Complainant Rambus Inc.'s Petition for Review in the Matter of Certain Semiconductor Chips and Products Containing Same served Mar. 29, 2012, re ITC Inv. No. 337-TA-753. 116 pages.
Respondents' Contingent Petition for Review of the Initial Determination in the Matter of Certain Semiconductor Chips and Products Containing the Same served Mar. 29, 2012 re ITC Inv. No. 337-TA-753. 84 pages.
Summary of Complainant's Petition for Review in the Matter of Certain Semiconductor Chips and Products Containing Same served Mar. 29, 2012 re ITC Inv. No. 337-TA-753. 17 pages.
Combined Response of the Office of Unfair Import Investigations to the Private Parties' Petitions for Review of the Initial Determination on Violation of Section 337 served Apr. 16, 2012 re ITC Inv. No. 337-TA-753. 104 pages.

Response of Complainant Rambus Inc. to Petitions for Review of Respondents and the Staff in the Matter of Certain Semiconductor Chips and Products Containing Same served Apr. 13, 2012 re ITC Inv. No. 337-TA-753. 87 pages.

Summary of Response of Complainant Rambus Inc. to Petitions for Review of Respondents and the Staff in the Matter of Certain Semiconductor Chips and Products Containing Same served Apr. 13, 2012 re ITC Inv. No. 337-TA-753. 17 pages.

Redacted Expert Report of Dr. Ali Hajimiri Regarding the Invalidity of US Patent Nos. in the Matter of Certain Semiconductor Chips and Products Containing Same dated Jul. 20, 2011 re ITC Inv. No. 337-TA-753. 412 pages.

Redacted Expert Report of Marwan Hassoun, Ph.D. Regarding Validity of U.S. Patent Nos. in the Matter of Certain Semiconductor Chips and Products Containing Same dated Jul. 20, 2011 re ITC Inv. No. 337-TA-753. 695 pages.

Redacted First Rebuttal Expert Report of Andrew C. Singer Ph.D. in the Matter of Certain Semiconductor Chips and Products Containing Same dated Aug. 2, 2011 re ITC Inv. No. 337-TA-753. 172 pages.

Redacted Second Rebuttal Expert Report of Andrew C. Singer Ph.D. in the Matter of Certain Semiconductor Chips and Products Containing Same served Aug. 3, 2011 re ITC Inv. No. 337-TA-753. 88 pages.

Redacted Direct Witness Statement of Dr. Ali Hajimiri in the Matter of Certain Semiconductor Chips and Products Containing Same dated Sep. 7, 2011 re ITC Inv. No. 337-TA-753. 298 pages.

Redacted Direct Witness Statement of Marwan Hassoun, Ph.D. in the Matter of Certain Semiconductor Chips and Products Containing Same submitted Sep. 7, 2011 re ITC Inv. No. 337-TA-753. 470 pages.

Redacted Rebuttal Witness Statement of Dr. Ali Hajimiri in the Matter of Certain Semiconductor Chips and Products Containing Same dated Sep. 21, 2011 re ITC Inv. No. 337-TA-753. 59 pages.

Redacted Corrected Rebuttal Witness Statement of Andrew C. Singer, Ph.D. in the Matter of Semiconductor Chips and Products Containing Same dated Oct. 19, 2011 re ITC Inv. No. 337-TA-753. 147 pages.

Redacted Respondents' Corrected Post-Trial Brief in the Matter of Certain Semiconductor Chips and Products Containing Same dated Jan. 6, 2012 (originally filed Nov. 8, 2011) re ITC Inv. No. 337-TA-753. 321 pages.

Redacted Respondents' Prehearing Statement and Brief in the Matter of Certain Semiconductor Chips and Products Containing the Same submitted Sep. 21, 2011 re ITC Inv. No. 337-TA-753. 475 pages.

Notice of Commission Determination Terminating the Investigation as to Three Respondents on the Basis of Settlement; Determination to Review in the Entirety a Final Initial Determination Finding no Violation of Section 337; Schedule for Filing Written Submissions on Certain Issues and on Remedy, the Public Interest and Bonding, Issued May 3, 2012 re ITC Inv. No. 337-TA-753, 6 pages.

Response of the Office of Unfair Import Investigations to the Notice of Commission Determination to Review in the Entirety a Final Determination Finding No Violation of Section 337, May 31, 2012, Public Version, In the Matter of "Certain semiconductor Chips and products Containing Same," Investigation No. 337-TA-753. 109 pages.

Respondents' Response to the Commission's Notice of Review, May 18, 2012, redacted, in the Matter of "Certain Semiconductor Chips and Products Containing the Same, " Investigation No. 337-TA-753. 116 pages.

Complainant Rambus Inc.'s Submission on the Issues of Remedy, the Public Interest, and Bonding, dated May 18, 2012, Redacted, Includes Exhibit A (General Exclusion Order), B (Limited Exclusion Order), and Exhibit C (Orders to Cease and desist), all dated Jun. 2012, In the Matter of "Certain Semiconductor Chips and Products Containing Same," Investigation No. 337-TA-753. 67 pages.

Respondents' Reply to Petition of Complainant Rambus Inc. and Contingent Petition of the Office of Unfair Import Investigations, Mar. 27, 2012, Redacted, In the Matter of "Certain Semiconductor Chips and Products containing the Same," Investigation No. 337-TA-753. 112 pages.

Summary of Respondents' Reply to Petition of Complainant Rambus Inc. and Contingent Petition of the Office of Unfair Import Investigations, Mar. 27, 2012, Redacted, In the Matter of "Certain Semiconductor Chips and Products Containing the Same," Investigation No. 337-TA-753. 15 pages.

Contingent Petition of the Office of Unfair Import Investigations for Review of the initial Determination on Violation of Section 337, Mar. 19, 2012, Redacted, In the Matter of "Certain Semiconductor Chips and Products Containing Same," Investigation No. 337-TA-753. 17 pages.

Complainant Rambus Inc.'s Response to the Commission's Notice to Review in the Entirety a Final Initial Determination Finding No Violation of Section 337, May 18, 2012, Redacted, In the Matter of "Certain Semiconductor Chips and Products Containing Same,"Investigation No. 337-TA-753. 115 pages.

DIGITAL TRANSMITTER

RELATED APPLICATIONS

This application is a continuation of U.S. application Ser. No. 13/027,893, filed Feb. 15, 2011, which is a continuation of U.S. application Ser. No. 12/571,582, filed Oct. 1, 2009, which is a continuation of application Ser. No. 11/514,735, filed Aug. 31, 2006, which is a continuation of application Ser. No. 11/483,971, filed Jul. 10, 2006, now abandoned, which is a continuation of application Ser. No. 10/372,630, filed on Feb. 24, 2003, now U.S. Pat. No. 7,099,404, which is a continuation of application Ser. No. 09/852,481, filed on May 10, 2001, now U.S. Pat. No. 6,542,555, which is a continuation of Ser. No. 08/882,252, filed on Jun. 25, 1997, now U.S. Pat. No. 6,266,379, which is a continuation-in-part of Ser. No. 08/880,980, filed on Jun. 23, 1997, now abandoned, which claims the benefit of U.S. Provisional Application No. 60/050,098, filed on Jun. 20, 1997.

The entire teachings of the above applications are incorporated herein by reference.

GOVERNMENT SUPPORT

The invention was supported, in whole or in part, by a grant No. F19628-92-C-0045 from Department of the Air Force. The Government has certain rights in the invention.

BACKGROUND OF THE INVENTION

The performance of many digital systems is limited by the interconnection bandwidth between chips, boards, and cabinets. As VLSI technology continues to scale, system bandwidth will become an even more significant bottleneck as the number of I/Os scales more slowly than the bandwidth demands of on-chip logic. Also, off-chip signaling rates have historically scaled more slowly than on-chip clock rates. Most digital systems today use full-swing unterminated signaling methods that are unsuited for data rates over 100 MHz on one meter wires. Even good current-mode signaling methods with matched terminations and carefully controlled line and connector impedance are limited to about 1 GHz by the frequency-dependent attenuation of copper lines. Without new approaches to high-speed signaling, bandwidth will stop scaling with technology when we reach these limits.

SUMMARY OF THE INVENTION

Conventional approaches to dealing with frequency dependent attenuation on transmission lines have been based on equalization, either in the transmitter or the receiver. For example, Tomlinson precoding is used in modems, and digital equalization in binary communication channels has been suggested in U.S. Pat. No. 4,374,426 to Burlage et al. However, such systems cannot scale to very high data rate binary or multilevel systems having bandwidths extending from near DC to greater than 100 MHz. Above 100 MHz, there is substantial attenuation due to skin effect resistance on conventional transmission lines.

The present invention enables equalizers which can be implemented as digital filters operating at acceptable clock speeds. For example, a three gigabit per second (Gbps) system can be implemented using 400 Mbps circuitry. The invention has particular application to nonmodulated, high data rate, binary or multilevel systems as found locally within a data processor cabinet or on a local area network.

In accordance with the present invention, a digital transmitter comprises an equalizer which emphasizes transition signal levels relative to repeated signal levels. In particular, a novel equalizer generates signal levels as a logical function of bit history to emphasize transition signal levels. Preferred implementations define the logical function of bit history in a look up table.

In preferred embodiments, the equalizer converts an input signal, having discrete signal levels at an input data rate, to an output signal having a greater number of discrete signal levels at the input data rate. In particular, the equalizer generates transmitted signal levels based on time since last signal transition. A particularly simple implementation is based on whether a current bit is equal to an immediately previous bit.

The clock rates of circuitry can be reduced by multiplexing outputs of parallel logic circuits operating on different multiple bit inputs to generate the signal levels. In an adaptive system, the level of equalization in the transmitter can be modified as a function of signals detected at the receiver.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The density and speed of modern VLSI technology can be applied to overcome the I/O bottleneck they have created by building sophisticated I/O circuitry that compensates for the characteristics of the physical interconnect and cancels dominant sources of timing and voltage noise. Such optimized I/O circuitry is capable of achieving I/O rates an order of magnitude higher than those commonly used today while operating at lower power levels.

A system embodying the invention can achieve a four Gbps signaling rate using 0.5 μm CMOS circuits by controlling and compensating for characteristics of the transmission medium, by cancelling timing skew, and through careful management of time and voltage noise.

Figure 1:
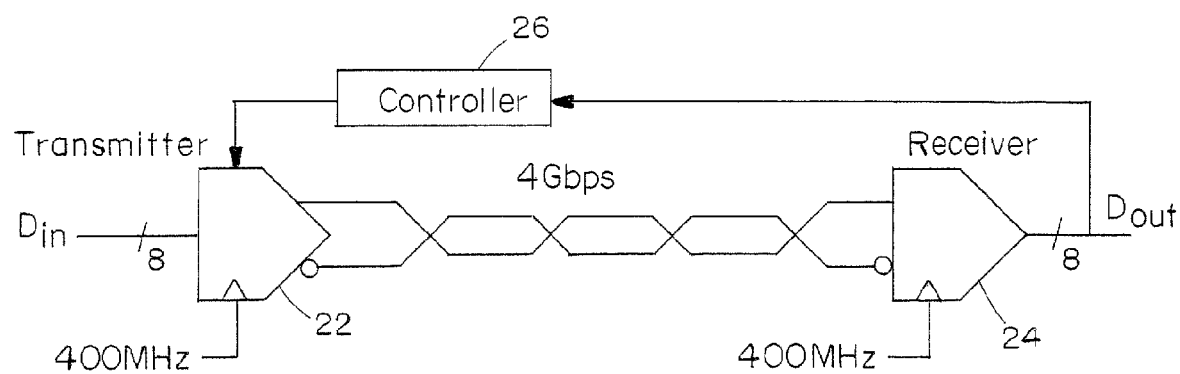
FIG. 1 illustrates a digital communication system embodying in the present invention.
Figure 13:
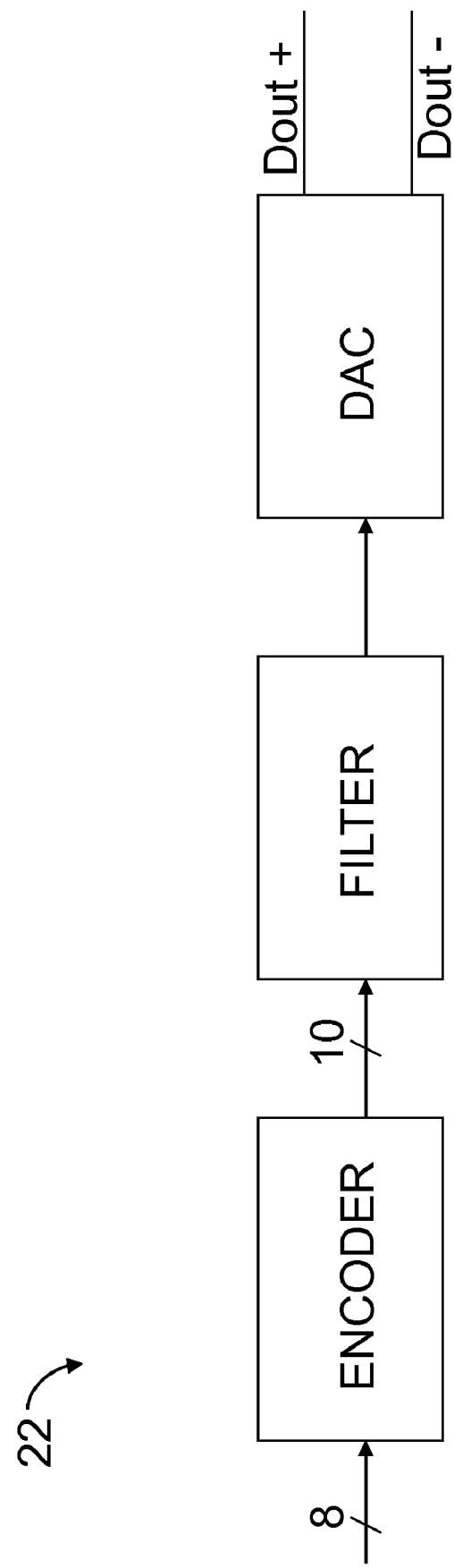
FIG. 13 illustrates a transmitter having an encoder, equalizing filter, and driving DAC.

FIG. 1 shows one channel of high-speed signaling system embodying the invention. A transmitter module 22 accepts 8-bit parallel data at 400 MHz. Each byte is coded into 10 bits (FIG. 13) for band-limiting and forward error correction and transmitted up to 3 m across a single differential transmission line. The transmitter pre-emphasizes the signal to compensate for expected line characteristics. The lossy transmission line as well as package and connector parasitics attenuate and distort the received waveform, and it is further corrupted by noise coupled from adjacent lines and the power supply. The receiver 24 accepts this noisy, distorted signal and its own 400 MHz clock. The receiver generates 4 GHz timing signals aligned to the received data, samples the noisy signal, decodes the signal, and produces synchronous 8-bit data out.

The availability of 4 Gbps electrical signaling will enable the design of low-cost, high-bandwidth digital systems. The wide, slow buses around which many contemporary digital systems are organized can be replaced by point-to-point networks using a single, or at most a few, high-speed serial channels resulting in significant reduction in chip and module pinouts and in power dissipation. A network based on 400 MBytes/s serial channels, for example, has several times the bandwidth of a 133 MBytes/s PCI-bus that requires about 80 lines. Also, depending on its topology, the network permits several simultaneous transfers to take place at full rate. A group of eight parallel channels would provide sufficient bandwidth (3.2 GBytes/s) for the CPU to memory connection of today's fastest processors. For modest distances (up to 30 m with 18AWG wire), high-speed electrical signaling is an attractive alternative to optical communication in terms of cost, power, and board area for peripheral connection and building-sized local-area networks.

Frequency-dependent Attenuation Causes Intersymbol Interference

Skin-effect resistance causes the attenuation of a conventional transmission line to increase with frequency. With a broadband signal, as typically used in digital systems, the superposition of unattenuated low-frequency signal components with attenuated high-frequency signal components causes intersymbol interference that degrades noise margins and reduces the maximum frequency at which the system can operate.

Figure 2A:
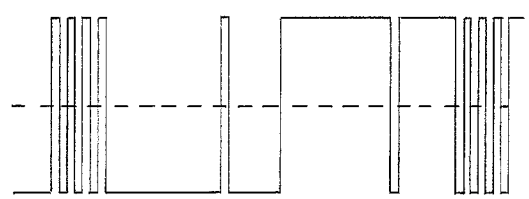
FIGS. 2A and 2B illustrate a sample binary pulse train and the resultant frequency dependent attenuation caused by a transmission line.
Figure 2B:
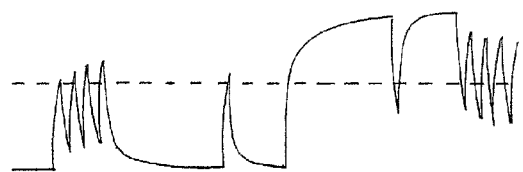
Figure 3A:
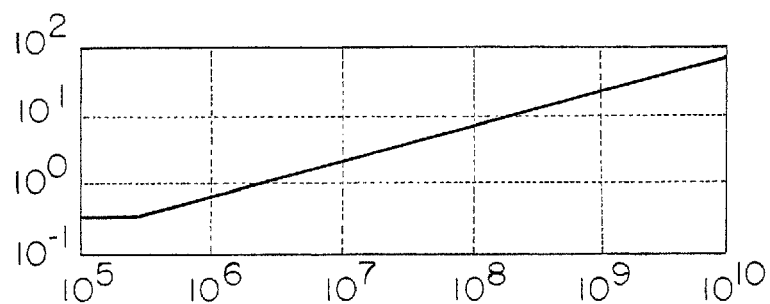
FIGS. 3A and 3B illustrate the resistance and attenuation curves for one meter of 30AWG, 100 ohm twisted pair transmission line.
Figure 3B:
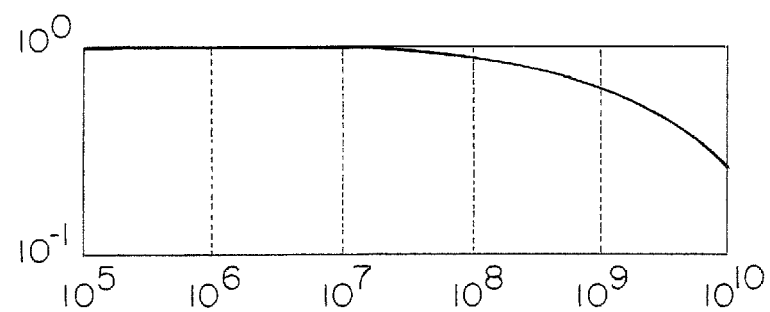
Figure 3C:
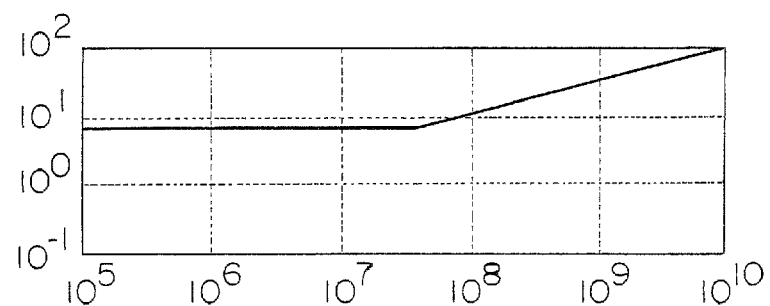
FIGS. 3C and 3D illustrate the resistance and attenuation curves for one meter of 5 mil 0.5 oz 50 ohm strip guide.
Figure 3D:
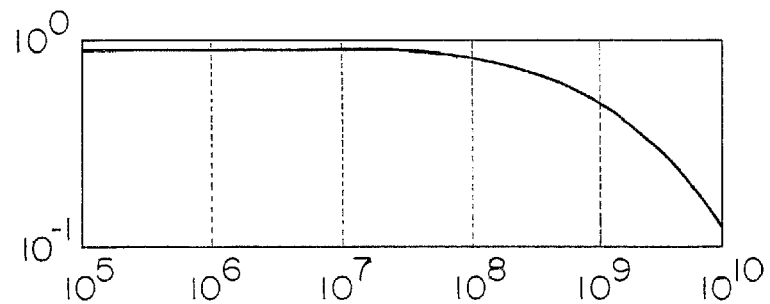

This effect is most pronounced in the case of a single 1 (0) in a field of 0s (1s) as illustrated in FIGS. 2A and B. The figures show a 4 Gb/s signal (FIG. 2A) and the simulated result of passing this signal across 3 m of 24AWG twisted pair (FIG. 2B). The highest frequency of interest (2 GHz) is attenuated by −7.6 dB (42%). The unattenuated low-frequency component of the signal causes the isolated high-frequency pulse to barely reach the midpoint of the signal swing giving no eye opening in a differential system and very little probability of correct detection.

The problem here is not the magnitude of the attenuation, but rather the interference caused by the frequency-dependent nature of the attenuation. The high-frequency pulse has sufficient amplitude at the receiver for proper detection. It is the offset of the pulse from the receiver threshold by low-frequency interference that causes the problem.

Later, we will see how using a transmitter equalizer to pre-emphasize the high-frequency components of the signal eliminates this problem. However, first we will characterize the nature of this attenuation in more detail.

FIGS. 3A-D show the resistance per meter and the attenuation per meter as a function of frequency for a 30AWG (d=128 mm) twisted pair with a differential impedance of 100 ohms (FIGS. 3A and 3B) and for a 5 mil (d=125 mm) half-ounce (0.7 mil thick) 50 ohms (FIGS. 3C and 3D) stripguide. For the 30AWG pair, the skin effect begins increasing resistance at 267 KHz and results in an attenuation to 56% of the original magnitude (−5 dB) per meter of cable at our operating frequency of 2 GHz corresponding to a bit rate of 4 Gb/s. Skin effect does not begin to effect the 5 mil PC trace until 43 MHz because of its thin vertical dimension. The high DC resistance (6.8 ohms/m) of this line gives it a DC attenuation of 88% (−1.2 dB). Above 70 MHz the attenuation rolls off rapidly reaching 40% (−8 dB) at 2 GHz. The important parameter, however, is the difference between the DC and high-frequency attenuation which is 45% (−6.8 dB).

Figure 4A:
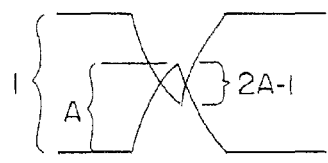
FIG. 4A illustrates respective plus and minus signals in a differential system and the reduced data eye due to attenuation.
Figure 4B:
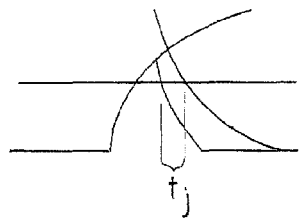
FIG. 4B illustrates trailing edge jitter.
Figure 4C:
FIG. 4C illustrates the data eye with equalization.

The effect of frequency dependent attenuation is graphically illustrated in the eye-diagrams of FIG. 4A-C. As shown in the waveform in FIG. 4A, without equalization, a high-frequency attenuation factor of A reduces the height of the eye opening to 2A-1 with the eye completely disappearing at $A \leq 0.5$. This height is the amount of effective signal swing available to tolerate other noise sources such as receiver offset, receiver sensitivity, crosstalk, reflections of previous bits, and coupled supply noise. Because the waveforms cross the receiver threshold offset from the center of the signal swing, the width of the eye is also reduced. As illustrated in FIG. 4B, the leading edge of the attenuated pulse crosses the threshold at the normal time. The trailing edge, however, is advanced by $t_j$. This data-dependent jitter causes greater sensitivity to skew and jitter in the signal or sampling clock and may introduce noise into the timing loop.

The waveform of FIG. 4C illustrates the situation when we equalize the signal by attenuating the DC and low frequency components so all components are attenuated by a factor of A. Here the height of the eye opening is A, considerably larger than 2A-1, especially for large attenuations. Also, because the waveforms cross at the midpoint of their swing, the width of the eye is a full bit-cell giving better tolerance of timing skew and jitter.

Preemphasizing Signal Transitions Equalizes Line Attenuation

Equalization eliminates the problem of frequency-dependent attenuation by filtering the transmitted or received waveform so the concatenation of the equalizing filter and the transmission line gives a flat frequency response. With equalization, an isolated 1 (0) in a field of 0s (1s) crosses the receiver threshold at the midpoint of its swing, as shown in FIG. 4C, rather than being offset by an unattenuated DC component, as shown in FIG. 4A. Narrow-band voice, video, and data modems have long used equalization to compensate for the linear portion of the line characteristics (Lee, Edward A., and Messerschmitt, David G., Digital Communication, Second Edition, Kluwer, 1994). However, it has not been used to date in broadband signaling with a wide bandwidth (i.e., greater than 100 MHz) over short distances.

We equalize the line using a 4 GHz FIR filter built into the current-mode transmitter. The arrangement is similar to the use of Tomlinson precoding in a narrowband modem (Tomlinson, M., "New Automatic Equalizer Employing Modulo Arithmetic," Electronic Letters, March 1971). In a high-speed digital system it is much simpler to equalize at the transmitter than at the receiver, as is more commonly done in communication systems. Equalizing at the transmitter allows us to use a simple receiver that just samples a binary value at 4 GHz. Equalizing at the receiver would require an A/D of at least a few bits resolution or a high-speed analog delay line, both difficult circuit design problems. A discrete-time FIR equalizer is preferable to a continuous-time passive or active filter as it is more easily realized in a standard CMOS process.

Figure 5A:
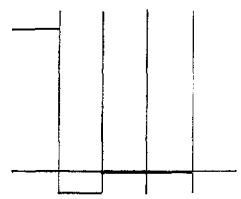
FIGS. 5A and 5B illustrate impulse response and frequency response of an equalizing filter embodying the invention.
Figure 5C:
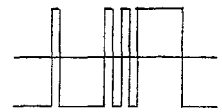
FIGS. 5C and 5D illustrate an example input sequence and output sequence from the equalizer.
Figure 5B:
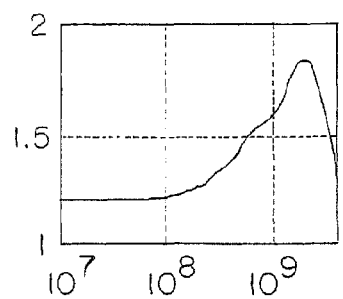

After much experimentation we have selected a five-tap FIR filter that operates at the bit rate. The weights are trained to match the filter to the frequency response of the line as described below. For a 1 m 30AWG line, the impulse response is shown in FIG. 5A. Each vertical line delimits a time interval of one bit-cell or 250 ps. The filter has a high-pass response as shown in FIG. 5B.

Figure 6A:
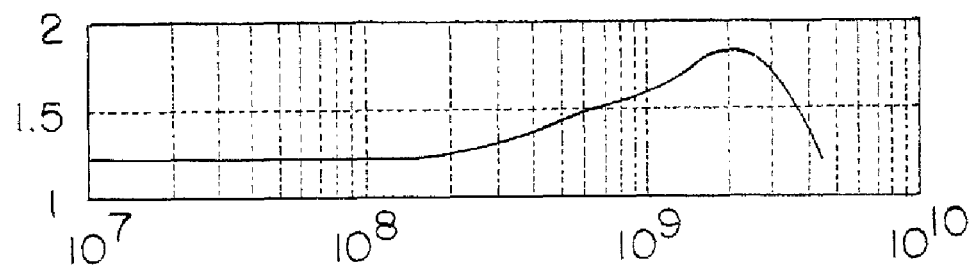
FIG. 6A illustrates the frequency response of an equalization filter embodying the invention.
Figure 6B:
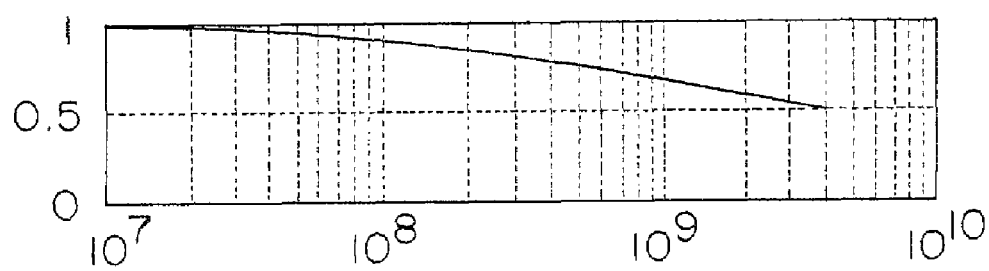
FIG. 6B illustrates transmission line attenuation.
Figure 6C:
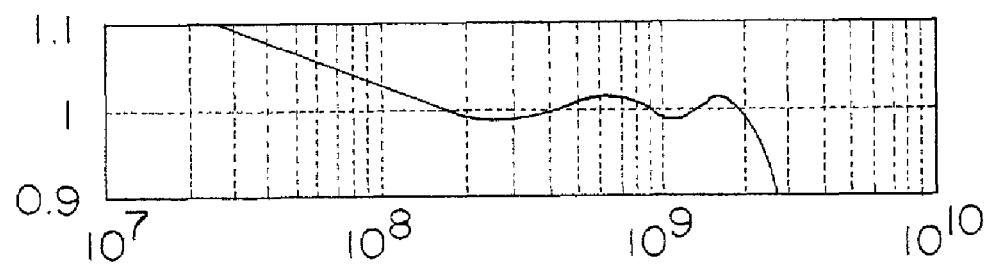
FIG. 6C illustrates the combination of equalization and line attenuation.

As shown in FIGS. 6A-C, this filter cancels the low-pass attenuation of the line giving a fairly flat response over the frequency band of interest (the decade from 200 MHz to 2 GHz). We band-limit the transmitted signal via coding (FIG. 13) to eliminate frequencies below 200 MHz. The equalization band is limited by the length of the filter. Adding taps to the filter would widen the band. We have selected five taps as a compromise between bandwidth and cost of equalization.

Figure 5D:
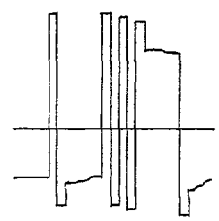

FIG. 6A shows the frequency response of the filter, FIG. 6B shows the frequency response of the line and FIG. 6C shows the combination (the product) for 1 m of 30AWG cable. The scale on FIG. 6C is compressed to exaggerate the effect. The filter cancels the response of parasitics as well as the response of the line. The response is flat to within 5% across the band of interest. The filter results in all transitions being full-swing, while attenuating repeated bits. FIG. 5D shows the response of the filter to an example data sequence shown in FIG. 5C (0000100001010111110000). The example shows that each signal transition goes full swing with the current stepped down to an attenuated level for repeated strings of 1s (0s).

Figure 7A:
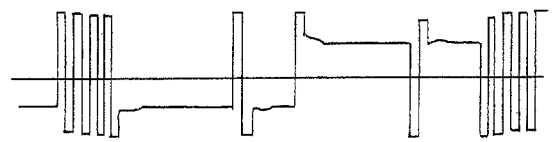
FIG. 7A illustrates an equalized transmitter signal based on the input signal of FIG. 2A.
Figure 7B:
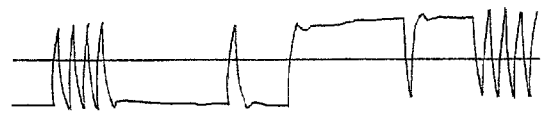
FIG. 7B illustrates the signal at the receiver resulting from the signal of FIG. 7A to be compared to FIG. 2B without equalization.

FIGS. 7A and B illustrate the application of equalization to the example of FIGS. 2A and 2B. FIG. 7A shows the filtered version of the original signal and FIG. 7B the received waveform. With equalization the isolated pulses and high-frequency segments of the signal are centered on the receiver threshold and have adequate eye openings for detection.

Circuit Implementations

Figure 8:
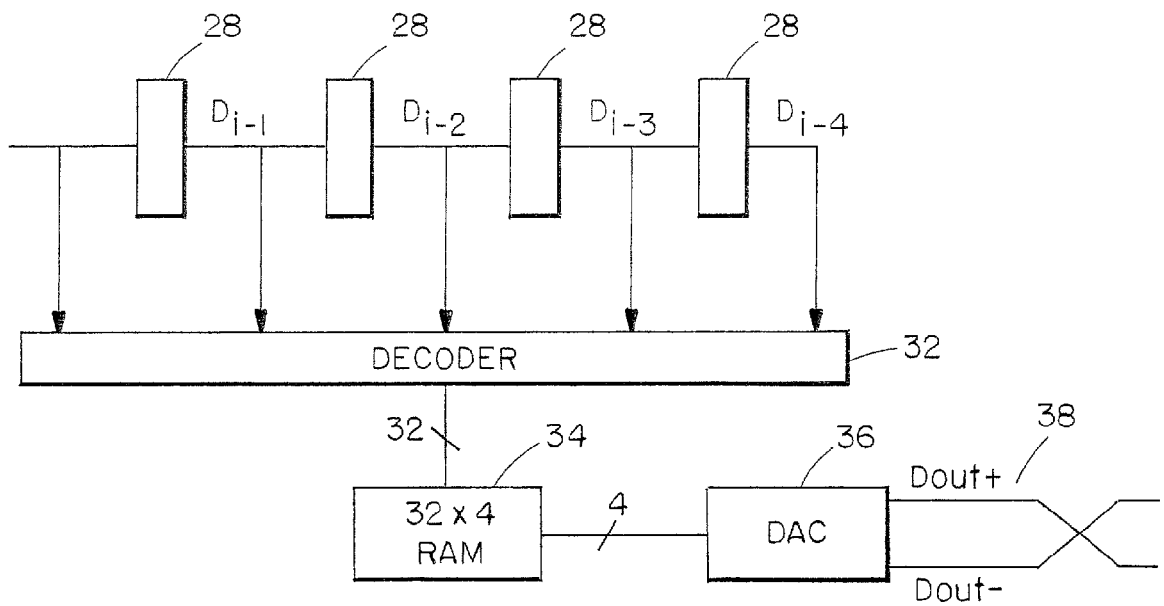
FIG. 8 illustrates one embodiment of an equalizer of the present invention including an FIR filter and digital-to-analog converter.

Preferred implementations of the invention include finite input response (FIR) filters, and FIG. 8 illustrates one such implementation. In this case, a 5 tap filter has been selected as a balance between higher fractional bandwidth and circuit complexity. With a greater number of taps, equalization can be obtained at lower frequencies. The present design provides for equalization in a range of 100 MHz to 2 GHz. By reducing to 2 or 3 taps, the lower end of the range may be no less than 500 MHz.

As in a conventional FIR filter, the input $D_i$ is delayed in successive delay elements 28. However, rather than weighting the individual delayed signals and summing the weighted signals to obtain the desired output, the delayed signals are applied to a 5-to-32 decoder 32.

One of the 32 output bits from the decoder 32 is high with any input state and that high bit addresses a 4 bit word from the 32x4 random access memory 34. The memory 34 is shown to be random access in order to allow for reprogramming of the equalization using a training process below. However, the system may be a fixed design which can be implemented using a read only memory.

Figure 9:
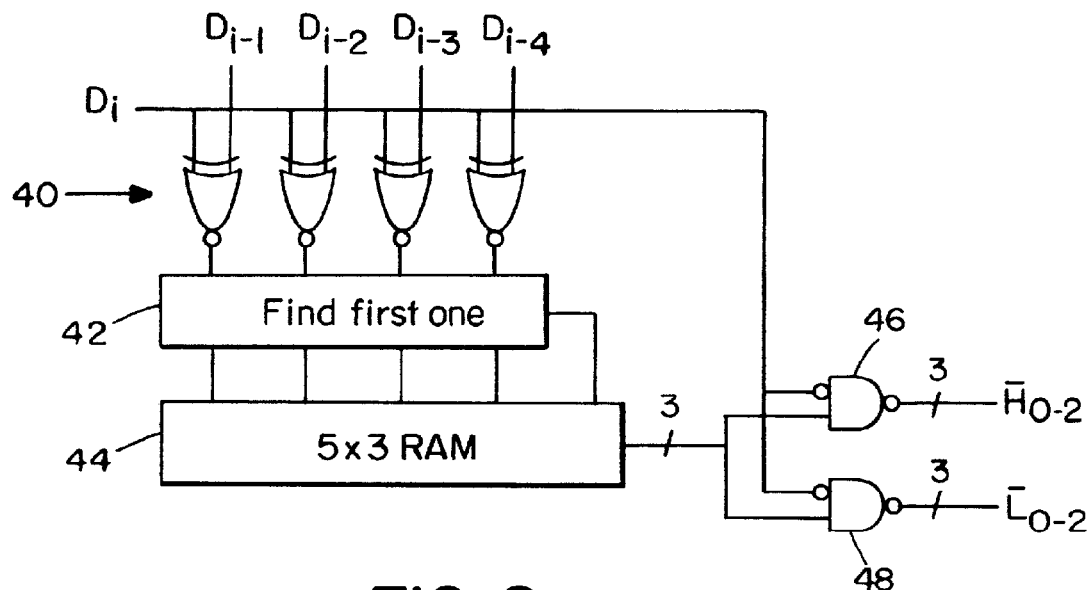
FIG. 9 illustrates a transition filter for use in a preferred embodiment of the invention.

The 4 bit output from RAM 34 defines one of the 15 output levels generated by a digital-to-analog converter 36 and applied to the transmission line 38. Those levels include 0, seven positive levels where Dout− is pulled low, and seven negative levels where Dout+ is pulled low. To simplify the implementation, each FIR filter is approximated by a transition filter implemented with a look-up table as illustrated in FIG. 9. The transition filter compares, in logic elements 40, the current data bit $D_i$ to each of the last four bits, and uses a find-first-one unit 42 to determine the number of bits since the last signal transition. The result is used to look up a 3-bit drive strength for the current bit from a 15-bit serially-loaded RAM 44. The drive strength is multiplied by the current bit with two sets of three NAND gates 46, 48 to generate three-bit high and low drive signals for the DAC.

While the transition filter is a non-linear element, it closely approximates the response of an FIR filter for the impulse functions needed to equalize typical transmission lines. Making this approximation greatly reduces the size and delay of the filter as a 96-bit RAM would be required to implement a full 5-tap FIR filter via a lookup table and the gates 46 and 48.

Figure 10:
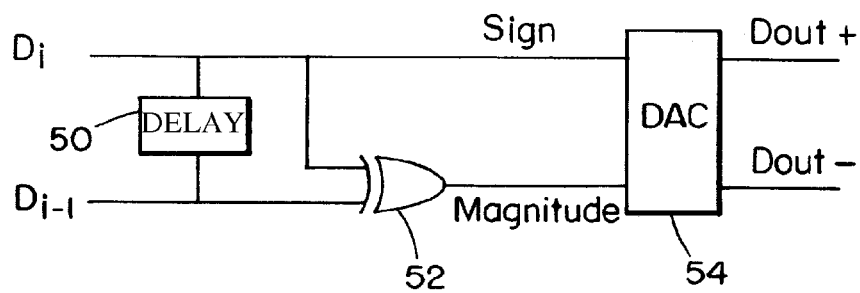
FIG. 10 illustrates a two tap transition filter embodying the invention.

The transition filter can be simplified even further to the simple logic circuit of FIG. 10 which operates as a two tap filter. The input signal $D_i$ is delayed in a single delay element 50 to produce the signal $D_{i-1}$. The two signals are combined in an exclusive-OR gate 52 to determine whether the current bit is equal to the immediately previous bit. If so, the lower magnitude output is generated by the digital-to-analog converter 54. If, on the other hand, there has been a transition since the previous bit, the output is emphasized. Thus, this simple circuit provides four output levels, two positive and two negative.

In yet another two-tap embodiment, with a transition, full current drive is used in opposite directions on both sides of the transition. When the signal value remains unchanged, an attenuated current drive is used.

Figure 11A:
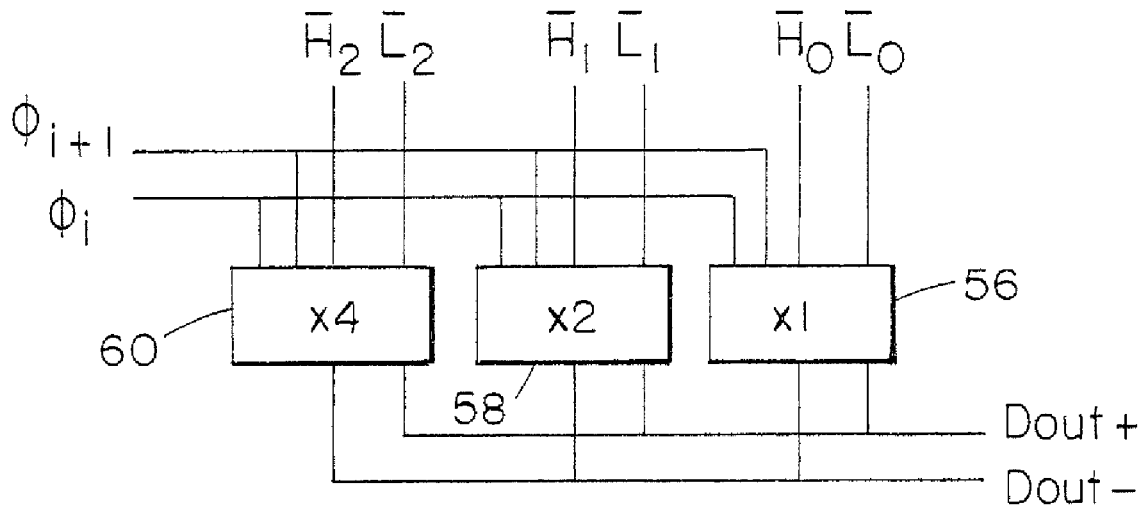
FIGS. 11A and 11B illustrate a digital to analog converter for use in the present invention.

The circuit design of the DAC used in the FIG. 9 embodiment is shown in FIGS. 11A and B. As shown in FIG. 11A, each DAC module is composed of three progressively sized differential pulse generators 56, 58 and 60. Each generator is enabled to produce a current pulse on Dout+(Dout$_{13}$) if the corresponding H (L) line is low. If neither line is low no pulse is produced. Depending on the current bit and the three-bit value read from the RAM 44 in the filter module, 15 different current values are possible (nominally from 8.75 mA to +8.75 ma in 1.25 mA steps). The timing of the pulse is controlled by a pair of clocks. A low-going on-clock $\phi_i$ gates the pulse on its falling edge. The high-true off clock $\phi_{i+1}$ gates the pulse off 250 ps later.

Figure 11B:
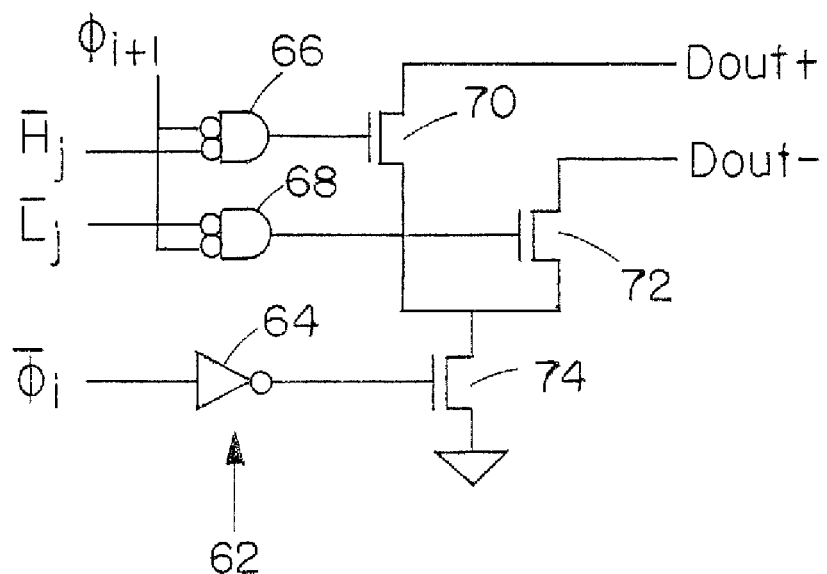

Each of the three differential pulse generators is implemented as shown in FIG. 11B. A pre-drive stage 62 inverts the on-clock in inverter 64 and qualifies the off-clock with the enable signals in NOR gates 66 and 68. A low (true) enable signal, which must be stable while the off-clock is low, turns on one of the two output transistors 70, 72, priming the circuit for the arrival of the on-clock. When the on-clock falls, the common tail transistor 74 is turned on, starting the current pulse. When the off-clock rises, the selected output transistor terminates the current pulse. The delay of the qualifying NOR-gate is carefully matched against that of the on-clock inverter to avoid distorting the pulse width.

To enable operation of the equalization circuit at rates in the order of gigahertz while using circuitry operating only in the order of hundreds of megahertz, the preferred embodiment generates the signal levels by multiplexing outputs of parallel logic circuits operating on different multiple bit inputs.

Figure 12:
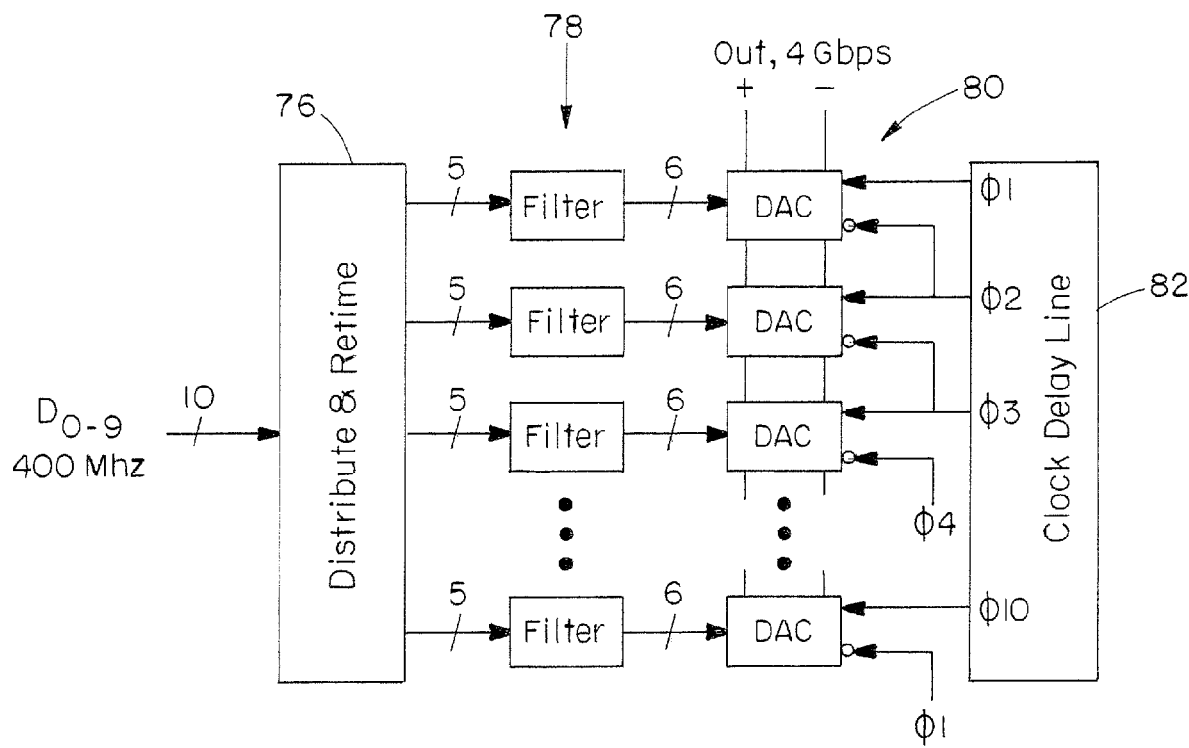
FIG. 12 illustrates a preferred multiplexed embodiment of the invention.

A block diagram of the multiplexed transmitter is shown in FIG. 12. The transmitter accepts 10 bits of data, $D_{0-9}$, at 400 MHz. A distribution block 76 delivers 5 bits of data to each of 10 FIR filters 78. The ith filter receives bit $D_i$ and the four previous bits. For the first four filters this involves delaying bits from the previous clock cycle. The distribution also retimes the filter inputs to the clock domain of the filter. Each filter 78 is a 5-tap transition filter that produces a 4-bit output encoded as 3 bits of positive drive and 3 bits of negative drive. These six bits from the filter directly select which of six pulse generators in the DAC 80 connected to that filter are enabled. The enabled pulse generators are sequenced by the 10-phase clock 82. The ith pulse generator is gated on by $\phi_i$ and gated off by $\phi_{i+1}$. To meet the timing requirements of the pulse generator, the ith filter operates off of clock $\phi_{i+1}$.

A training sequence may be used to initialize the transmitter pre-emphasis filter at powerup. Training is performed under the control of a supervisory processor 26 that interfaces with the transmitter on one end of the line and the receiver on the other end via a low-speed serial scan chain. A preliminary version of a training sequence for one channel is as follows:

1. The frequency response of the line is measured. The transmitter is commanded to turn off precompensation and send an alternating sequence of 1s and 0s. The receiver measures the level of the received signal by using a feedback transmitter to shift the DC operating point of the sense-amplifiers. The process is repeated at other bit rates to trace out the attenuation curve. For example, bit rates of $R_{max}$, $R_{max}/2$, $R_{max}/3$ . . . may be tested.
2. Based on the attenuation measurements taken in (1), the transmitter equalization is set by programming the FIR filter and/or DAC.

Conclusion

Transmitter equalization extends the data rates and distances over which electronic digital signaling can be reliably used. Preemphasizing the high-frequency components of the signal compensates for the low-pass frequency response of the package and transmission line. This prevents the unattenuated low-frequency components from interfering with high-frequency pulses by causing offsets that prevent detection. With equalization an isolated pulse at the receiver has the same amplitude as a long string of repeated bits. This gives a clean received signal with a good eye opening in both the time and voltage dimensions.

In one embodiment, we implement equalization for a 4 Gbs signaling system by building a 4 GHz, five-tap FIR filter into the transmitter. This filter is simple to implement yet equalizes the frequency response to within 5% across the band of interest. The filter is realized using 0.5 mm CMOS circuitry operating at 400 MHz using a bank of 10 filters and DACs sequenced by a 10-phase 400 MHz clock. Narrow drive periods are realized using series gating to combine two clock phases, an on-phase and off-phase, in each DAC. We have simulated extracted layout of the equalized transmitter driving a load through package parasitics and 1m of differential strip guide to demonstrate the feasibility of this approach.

The equalizing transmitter described here is one component of a 4 Gbs signaling system we are currently developing for implementation in an 0.5 ÿm CMOS technology. The system also relies on low jitter timing circuitry, automatic per-line skew compensation, a narrow-aperture receive amplifier, and careful package design.

The availability of 4 Gbs serial channels in a commodity CMOS technology will enable a range of system opportunities. The ubiquitous system bus can be replaced by a lower-cost yet higher-speed point-to-point network. A single hub chip with 32 serial ports can directly provide the interconnection for most systems and can be assembled into more sophisticated networks for larger systems. A single 4 Gbs serial channel provides adequate bandwidth for most system components and multiple channels can be ganged in parallel for higher bandwidths.

Figure 14:
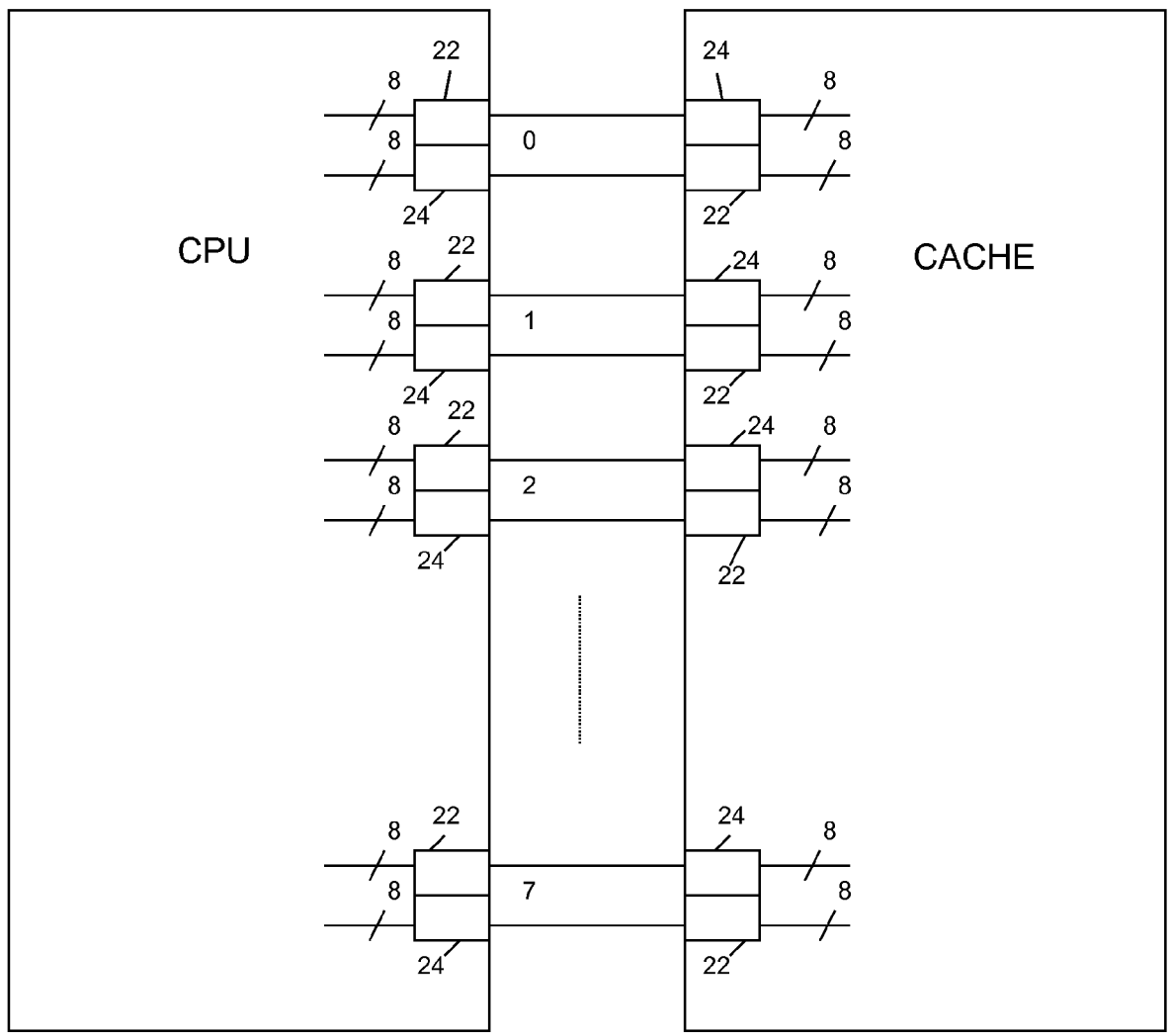
FIG. 14 illustrates a CPU to cache interface embodying the present invention.

A 4 Gbs serial channel can also be used as a replacement technology at both the component and system level. At the component level, a single serial channel (two pins) replaces 40 100 MHz pins. A 4 GByte/s CPU to L2 cache interface, for example, (FIG. 14) could be implemented with just eight serial channels. At the system level, high-speed electrical serial channels are a direct replacement for expensive optical interconnect. Using 18AWG wire, these channels will operate up to lengths of 10 m enabling high-bandwidth, low-cost peripheral connections and local-area networks. Inexpensive electrical repeaters can be used to operate over substantially longer distances.

Even with 4 Gbs channels, system bandwidth remains a major problem for system designers. On-chip logic bandwidth (gates×speed) is increasing at a rate of 90% per year (60% gates and 20% speed). The density and bandwidth of system interconnect is increasing at a much slower rate of about 20% per year as they are limited by mechanical factors that are on a slower growth curve than that of semiconductor lithography. A major challenge for designers is to use scarce system interconnect resources effectively, both through the design of sophisticated signaling systems that use all available wire bandwidth and through system architectures that exploit locality to reduce the demands on this bandwidth.

While this invention has been particularly shown and described with references to preferred embodiments thereof, it will be understood by those skilled in the art that various changes in form and details may be made therein without departing from the spirit and scope of the invention as defined by the appended claims.

What is claimed is:
1. A semiconductor device comprising:
    a semiconductor chip;
    a transmitter circuit on the semiconductor chip to receive input bits and to responsively generate a serial output signal having a sequence of signal levels, the input bits having a data rate, and the signal levels having a rate equal to the data rate;
    where
        the transmitter circuit includes a filter having three taps, each tap driven responsive to a respective one of the input bits, and
        the filter is to attenuate signal levels in the serial output signal representing no variation between adjacent input bits relative to variation between the adjacent input bits, such that signal levels in the serial output signal are emphasized for bits that represent transitions in logic level between adjacent ones of the inputs bits relative to bits that do not represent transitions in logic level between the adjacent ones of the input bits.

2. The semiconductor device of claim 1, where each signal level in the serial output signal has one of at least four values, including a first value if a first one and a second one of the input bits each have a first binary state, a second value if the first and second ones of the input bits each have a second binary state, a third value if the first and second ones of the input bits have the first and second binary states, respectively, and a fourth value if the first and second ones have the second and first binary states, respectively.

3. The semiconductor device of claim 2, where the first and second ones of the input bits are adjacent ones of the input bits.

4. The semiconductor device of claim 3, where:
the transmitter circuit is to drive a differential output;
the first value and the second value represent substantially equal drive strength but with opposite polarity in the differential output;
the third value and the fourth value represent substantially equal drive strength but with opposite polarity in the differential output;
the third value represents the same polarity but greater drive strength in the differential output than the second value; and
the fourth value represents the same polarity but greater drive strength in the differential output than the first value.

5. The semiconductor device of claim 2, where the first and the second ones of the input bits represent a current bit to be transmitted by the transmitter circuit and an immediately previous bit in the input bits, respectively.

6. The semiconductor device of claim 1, where the transmitter circuit generates each signal level responsive to each of the three taps.

7. The semiconductor device of claim 6, where the filter has five taps including the three taps, and where the transmitter circuit generates each signal level responsive to each of the five taps.

8. The semiconductor device of claim 1, where for each one of two possible binary states for each input bit, the transmitter circuit generates the serial output signal using one of at least two possible drive strengths, including a first drive strength when a current bit has a binary state equal to an immediately subsequent bit in the input bits, and a second drive strength when the current bit has a binary state not equal to the immediately subsequent bit in the input bits.

9. The semiconductor device of claim 1, where the semiconductor device is to accept parallel data and is to band limit and encode the parallel data to generate the input bits.

10. The semiconductor device of claim 9, where the semiconductor device is to encode 8 bits of parallel data to responsively generate 10 bits of band limited, encoded data as part of the input bits.

11. The semiconductor device of claim 1, where the signal levels of the serial output sequence are to vary in frequency over a range that includes $R_{max}$, $R_{max}/2$ and $R_{max}/3$, where $R_{max}$ represents an alternating sequence of ones and zeros in the input bits.

12. The semiconductor device of claim 1, where the transmitter circuit is programmable to adjust attenuation provided by the filter.

13. The semiconductor device of claim 12, further comprising a memory to store a drive strength used to transmit a given bit from the input bits, the drive strength accessed at an address in the memory dependent upon collective output of the three taps.

14. The semiconductor device of claim 1, where the transmitter circuit is programmable responsive to measurements taken at a receiver via a training process.

15. A semiconductor device, comprising:
a semiconductor chip;
a transmitter circuit on the semiconductor chip to receive input bits and to responsively generate a serial output signal having a sequence of signal levels;
where
the transmitter circuit includes a filter with three taps,
each input bit is represented by one signal level only in the serial output signal, and
the transmitter circuit is to use the filter to emphasize signal levels representing transition in binary state between adjacent input bits, relative to no transition in binary state between adjacent input bits.

16. The semiconductor device of claim 15, where each signal level in the serial output signal has one of at least four values, including a first value if a first one and a second one of the input bits each have a first binary state, a second value if the first and second ones of the input bits each have a second binary state, a third value if the first and second ones of the input bits have the first and second binary states, respectively, and a fourth value if the first and second ones have the second and first binary states, respectively.

17. The semiconductor device of claim 16, where:
the transmitter circuit is to drive a differential output;
the first value and the second value represent substantially equal drive strength but with opposite polarity in the differential output;
the third value and the fourth value represent substantially equal drive strength but with opposite polarity in the differential output;
the third value represents the same polarity but greater drive strength in the differential output than the second value; and
the fourth value represents the same polarity but greater drive strength in the differential output than the first value.

18. The semiconductor device of claim 15, where the input bits represent a first data rate, and the serial output signal has a second data rate, substantially equal to the first data rate.

19. The semiconductor device of claim 15, where the transmitter circuit generates each signal level responsive to each of the three taps.

20. The semiconductor device of claim 19, where the filter has five taps including the three taps.

21. The semiconductor device of claim 16, where the semiconductor device is to accept parallel data and where the signal levels of the serial output signal are to vary in frequency over a range that includes $R_{max}$, $R_{max}/2$ and $R_{max}/3$, where $R_{max}$ represents an alternating sequence of ones and zeros in the parallel data.

22. The semiconductor device of claim 15, where the transmitter circuit is programmable to adjust attenuation provided by the filter.

23. The semiconductor device of claim 15, where the transmitter circuit is programmable responsive to measurements taken at a receiver via a training process.

24. A semiconductor device comprising:
a semiconductor chip;
a transmitter circuit on the semiconductor chip to receive input bits and to responsively generate a serial output signal having a sequence of signal levels;
where
the transmitter circuit includes a filter having three taps, including a tap representing a current one of the input bits to be transmitted, and a tap representing an adjacent, prior input bit in the input bits, each input bit is represented by exactly one signal level in the serial output signal, where each signal level has one of at least four possible values, depending on a binary state of a current bit to be transmitted, and depending upon whether an adjacent input bit in the input bits is of the same binary state as the current bit to be transmitted, and each signal level is produced by a combination of each tap from the filter, driven responsive to the binary states of corresponding bits from the input bits.

25. The semiconductor device of claim 24, where each input bit is represented in the serial output signal in a manner that emphasizes transition in logic level relative to the adjacent prior input bit.

26. The semiconductor device of claim 24, where each signal level has one of exactly four possible values, depending on the binary state of the current bit to be transmitted, and depending upon whether the adjacent input bit in the input bits is of the same binary state as the current bit to be transmitted.

27. The semiconductor device of claim 26, where the four possible values are respectively a first value if a first one and a second one of the input bits each have a first binary state, a second value if the first and second ones of the input bits each have a second binary state, a third value if the first and second ones of the input bits have the first and second binary states, respectively, and a fourth value if the first and second ones have the second and first binary states, respectively.

28. The semiconductor device of claim 27, where:
the transmitter circuit is to drive a differential output;
the first value and the second value represent substantially equal drive strength but with opposite polarity in the differential output;
the third value and the fourth value represent substantially equal drive strength but with opposite polarity in the differential output;
the third value represents the same polarity but greater drive strength in the differential output than the second value; and
the fourth value represents the same polarity but greater drive strength in the differential output than the first value.

29. The semiconductor device of claim 24, where the semiconductor device is to accept parallel data and where the signal levels of the serial output signal are to vary in frequency over a range that includes $R_{max}$, $R_{max}/2$ and $R_{max}/3$, where $R_{max}$ represents an alternating sequence of ones and zeros in the parallel data.

30. The semiconductor device of claim 24, where the transmitter circuit is programmable to adjust attenuation provided by the filter.

31. The semiconductor device of claim 30, where the transmitter circuit is programmable responsive to measurements taken at a receiver via a training process.

32. A semiconductor device, comprising:
a semiconductor chip;
a transmitter circuit on the semiconductor chip to receive input bits and to responsively generate a serial output signal having a sequence of signal levels;
where
the transmitter circuit includes a three tap filter to produce a single signal level in the serial output signal for each bit in the input sequence, each signal level having one four possible values, depending on a value of a current input bit to be transmitted, and depending upon whether an adjacent input bit in the input bits has a common binary state to the current input bit to be transmitted, each tap receiving a different one of the input bits to produce the signal level for the current input bit, each signal level produced responsive to all three taps of the filter.

33. The semiconductor device of claim 32, where the four possible values are respectively a first value if a first one and a second one of the input bits each have a first binary state, a second value if the first and second ones of the input bits each have a second binary state, a third value if the first and second ones of the input bits have the first and second binary states, respectively, and a fourth value if the first and second ones have the second and first binary states, respectively.

34. The semiconductor device of claim 33, where:
the transmitter circuit is to drive a differential output;
the first value and the second value represent substantially equal drive strength but with opposite polarity in the differential output;
the third value and the fourth value represent substantially equal drive strength but with opposite polarity in the differential output;
the third value represents the same polarity but greater drive strength in the differential output than the second value; and
the fourth value represents the same polarity but greater drive strength in the differential output than the first value.

35. The semiconductor device of claim 34, where the semiconductor device is to accept parallel data and where the signal levels of the serial output signal are to vary in frequency over a range that includes $R_{max}$, $R_{max}/2$ and $R_{max}/3$, where $R_{max}$ represents an alternating sequence of ones and zeros in the parallel data.

36. A semiconductor device comprising:
a semiconductor chip;
a transmitter circuit on the semiconductor chip to receive input bits and to responsively generate a serial output signal having a sequence of signal levels, the input bits having a data rate, and the signal levels having a rate equal to the data rate;
where
the transmitter circuit includes a filter driven responsive to three respective ones of the input bits, and
the filter is to attenuate signal levels in the serial output signal representing no variation between adjacent input bits relative to variation between the adjacent input bits, such that signal levels in the serial output signal are emphasized for bits that represent transitions in logic level between adjacent ones of the inputs bits relative to bits that do not represent transitions in logic level between the adjacent ones of the input bits.

37. The semiconductor device of claim 36, where each signal level in the serial output signal has one of at least four values, including a first value if a first one and a second one of the input bits each have a first binary state, a second value if the first and second ones of the input bits each have a second binary state, a third value if the first and second ones of the input bits have the first and second binary states, respectively, and a fourth value if the first and second ones have the second and first binary states, respectively.

38. The semiconductor device of claim 36, where:
the transmitter circuit is to drive a differential output;
the first value and the second value represent substantially equal drive strength but with opposite polarity in the differential output;

the third value and the fourth value represent substantially equal drive strength but with opposite polarity in the differential output;

the third value represents the same polarity but greater drive strength in the differential output than the second value; and the fourth value represents the same polarity but greater drive strength in the differential output than the first value.

39. The semiconductor device of claim 36, where the filter has three taps, each tap driven responsive to a respective one of the three input bits.

40. The semiconductor device of claim 39, where the transmitter circuit generates each signal level responsive to each of the three taps.

41. The semiconductor device of claim 40, where the transmitter circuit is programmable to adjust attenuation provided by the filter.

42. The semiconductor device of claim 40, where the signal levels of the serial output sequence are to vary in frequency over a range that includes Rmax, Rmax/2 and Rmax/3, where Rmax represents an alternating sequence of ones and zeros in the input bits.

43. The semiconductor device of claim 42, where the semiconductor device is to encode 8 bits of parallel data to responsively generate 10 bits of band limited, encoded data as part of the input bits.

* * * * *

UNITED STATES PATENT AND TRADEMARK OFFICE
CERTIFICATE OF CORRECTION

| | | |
|---|---|---|
| PATENT NO. | : 8,238,470 B2 | Page 1 of 1 |
| APPLICATION NO. | : 13/090507 | |
| DATED | : August 7, 2012 | |
| INVENTOR(S) | : William J. Dally | |

It is certified that error appears in the above-identified patent and that said Letters Patent is hereby corrected as shown below:

In the drawings, sheet 6, Fig. 9, the inverting bubble at the input of Gate 46 in Fig. 9 has been deleted: please replace Fig. 9 with attached Fig. 9 below.

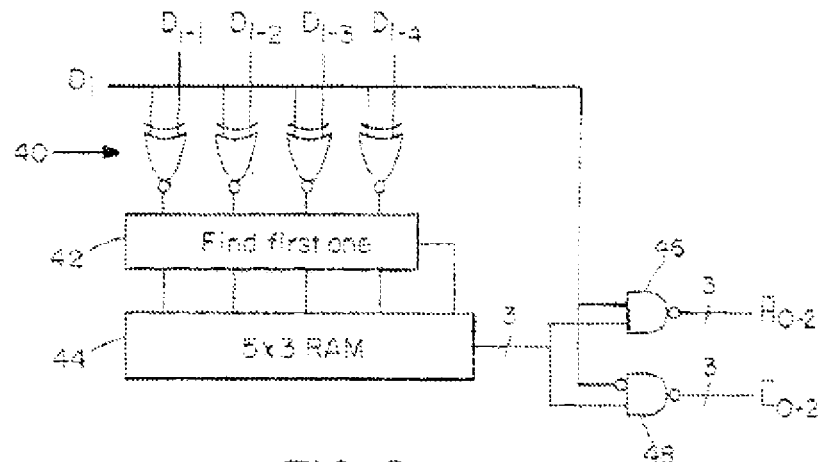

FIG. 9

Signed and Sealed this
Fifteenth Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,238,470 B2 | Page 1 of 1 |
| APPLICATION NO. | : 13/090507 | |
| DATED | : August 7, 2012 | |
| INVENTOR(S) | : William J. Dally | |

It is certified that error appears in the above-identified patent and that said Letters Patent is hereby corrected as shown below:

In the specification

Please delete the paragraph titled "GOVERNMENT SUPPORT" encompassing Column 1, lines 24-29:

"The invention was supported, in whole or in part, by a grant No. F19628-92-C-0045 from Department of the Air Force. The Government has certain rights in the invention."

and replace with:

"This invention was made with Government support under Contract No. F19628-92-C-0045 awarded by the U.S. Air Force. The Government has certain rights in the invention."

Signed and Sealed this
Ninth Day of August, 2016

Michelle K. Lee
*Director of the United States Patent and Trademark Office*